(12) United States Patent
Mohan et al.

(10) Patent No.: US 11,870,352 B2
(45) Date of Patent: Jan. 9, 2024

(54) DUAL ACTIVE BRIDGE CONVERTER CONTROL WITH INTRA-BRIDGE PHASE SHIFT

(71) Applicant: Rivian IP Holdings, LLC, Plymouth, MI (US)

(72) Inventors: Vishnu Mohan, Jersey City, NJ (US); Younes Sangsefidi, Irvine, CA (US); Chia-Chou Yeh, Torrance, CA (US); Yang Liu, Irvine, CA (US); Steven Schulz, Torrance, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 91 days.

(21) Appl. No.: 17/341,629

(22) Filed: Jun. 8, 2021

(65) Prior Publication Data

US 2022/0399819 A1 Dec. 15, 2022

(51) Int. Cl.
*H02M 3/335* (2006.01)
*H02M 1/00* (2006.01)

(52) U.S. Cl.
CPC ...... *H02M 3/33569* (2013.01); *H02M 1/0012* (2021.05)

(58) Field of Classification Search
CPC .............. H02M 3/33569; H02M 1/0012
See application file for complete search history.

(56) References Cited

U.S. PATENT DOCUMENTS

| | | | |
|---|---|---|---|
| 10,250,053 B2* | 4/2019 | Xue | H02M 7/797 |
| 10,749,441 B1* | 8/2020 | Singh | H02M 3/33584 |
| 11,021,069 B1* | 6/2021 | Elshaer | B60L 50/60 |
| 11,522,437 B1* | 12/2022 | Sangsefidi | H02M 3/33584 |
| 2015/0049518 A1* | 2/2015 | Harrison | H02M 7/4807 |
| | | | 363/17 |

OTHER PUBLICATIONS

Jain, A.K., et al., "PWM Control of Dual Active Bridge: Comprehensive Analysis and Experimental Verification," IEEE Transactions on Power Electronics, vol. 26, No. 4, pp. 1215-1227 (Apr. 2011).

* cited by examiner

*Primary Examiner* — Kyle J Moody
(74) *Attorney, Agent, or Firm* — Haley Guiliano LLP

(57) ABSTRACT

Systems and methods for controlling a dual active bridge converter are disclosed herein. An output voltage of a dual active bridge converter is sensed. Based at least in part on the output voltage, a target intra-bridge phase shift amount between two bridges of the dual active bridge converter is computed. A plurality of switch control signals, which are provided to respective switches of the dual active bridge converter, are caused to switch according to a time-based switching sequence based on the target intra-bridge phase shift amount to compensate for variations in the output voltage.

20 Claims, 16 Drawing Sheets

DUAL ACTIVE BRIDGE CONVERTER CONTROL WITH INTRA-BRIDGE PHASE SHIFT

INTRODUCTION

The present disclosure relates to dual active bridge converters and, more particularly, to systems and related processes for controlling a dual active bridge converter to compensate for variations in output voltage owing to load variations, such as load variations that may occur during the charging of an electric vehicle.

SUMMARY

Dual active bridge converters are utilized to provide direct current-to-direct current (DC-DC) conversion for a multitude of applications. One such application is an electric vehicle charging station, in which a dual active bridge converter receives a DC voltage derived from an AC power grid, converts the received DC voltage to another DC voltage, and provides the converted DC voltage to a charging port of an electric vehicle. For improved efficiency, the present disclosure provides systems and methods for controlling a dual active bridge converter to utilize zero voltage switching across a wide variety of output load conditions, particularly for applications like electric vehicle charging in which the output voltage of the dual active bridge converter varies widely owing to the output load variations during a charging cycle. Such control of a dual active bridge converter is advantageous over conventional dual active bridge converters that possessed a limited range of operating conditions that, for instance, cannot achieve zero voltage switching in light load conditions and therefore yield low efficiency under light load conditions.

The present disclosure provides systems and related methods that utilize adaptive intra-bridge phase shifting to control a dual active bridge converter in a manner that yields improved efficiency by extending the zero voltage switching range of operation across a wide range of load conditions. According to one example method, an output voltage of a dual active bridge converter is sensed. Based at least in part on the output voltage, a target intra-bridge phase shift amount between two bridges of the dual active bridge converter is computed. A plurality of switch control signals, which are provided to respective switches of the dual active bridge converter, are caused to switch according to a time-based switching sequence based on the target intra-bridge phase shift amount to compensate for variations in the output voltage.

The target intra-bridge phase shift amount, in some examples, is computed based on a rule stored in memory that maps output voltages to respective target intra-bridge phase shift amounts associated with zero voltage switching for the respective output voltages. In such examples, the time-based switching sequence is a zero voltage switching sequence generated based on the target intra-bridge phase shift amount.

In some aspects, the method further includes computing a voltage transfer ratio based on the output voltage and an input voltage of the dual active bridge converter. Based on the voltage transfer ratio, an intra-bridge phase shift computation algorithm is selected from among stored intra-bridge phase shift computation algorithms. The target intra-bridge phase shift amount is computed based on the selected intra-bridge phase shift computation algorithm. Selecting the intra-bridge phase shift computation algorithm, in some examples, comprises determining whether the voltage transfer ratio is satisfies a threshold, and selecting the intra-bridge phase shift computation algorithm from among the stored intra-bridge phase shift computation algorithms, based on whether the voltage transfer ratio satisfies the threshold. Selecting the intra-bridge phase shift computation algorithm, in another example, further includes selecting a first intra-bridge phase shift computation algorithm in response to determining that the voltage transfer ratio satisfies the threshold, and selecting a second intra-bridge phase shift computation algorithm, distinct from the first intra-bridge phase shift computation algorithm, in response to determining that the voltage transfer ratio does not satisfy the threshold.

The method, in a further example, includes determining a target effective phase shift based on a target power transfer amount. In such an example, the target intra-bridge phase shift amount may be computed based at least in part on the target effective phase shift.

In one example, the input voltage may be determined by detecting a signal level at an input port of the dual active bridge converter that receives power from an electrical power grid. In another example, the input voltage may be determined by retrieving an input voltage value stored in memory. The output voltage may be determined by detecting a signal level at an output port of the dual active bridge converter that is coupled to a rechargeable battery.

In another aspect, causing the plurality of switch control signals to switch according to the time-based switching sequence includes selectively switching in succession respective control signals at respective times within a time period based on the selected intra-bridge phase shift amount.

In some examples, the method further includes determining an updated value of the input voltage and/or the output voltage of the dual active bridge converter and, in response to determining the updated value of at the input voltage and/or output voltage, computing, based on the updated input voltage and/or output voltage value(s), an updated target intra-bridge phase shift amount between the two bridges of the dual active bridge converter. The switch control signals, which are provided to the dual active bridge converter, are then caused to switch according to an updated time-based switching sequence based on the updated target intra-bridge phase shift amount.

In accordance with another aspect of the disclosure, a system for controlling a dual active bridge converter is described. The system includes a memory, an input port, output ports, and control circuitry. The input port is coupled to an output port of the dual active bridge converter. The output ports are coupled to respective switches of the dual active bridge converter. The control circuitry is coupled to the memory, the input port, and the output ports. The control circuitry is configured to execute instructions stored in the memory to implement steps of various methods described herein. The control circuitry determines an output voltage of the dual active bridge converter via the input port. Based on the output voltage of the dual active bridge converter, the control circuitry determines a target intra-bridge phase shift amount between two bridges of the dual active bridge converter. The control circuitry then causes switch control signals, which are provided to respective switches of the dual active bridge converter via the output ports, to switch according to a time-based switching sequence based on the target intra-bridge phase shift amount to compensate for variations in the output voltage.

In some examples, the control circuitry is configured to compute the target intra-bridge phase shift amount based on a rule stored in memory that maps output voltages to respective intra-bridge phase shift amounts associated with zero voltage switching for the respective output voltages. In such examples, the time-based switching sequence is a zero voltage switching sequence generated based on the target intra-bridge phase shift amount.

In some aspects, the control circuitry is further configured to compute a voltage transfer ratio based on the output voltage and an input voltage of the dual active bridge converter. Based on the voltage transfer ratio, the control circuitry selects an intra-bridge phase shift computation algorithm from among intra-bridge phase shift computation algorithms stored in the memory. The target intra-bridge phase shift amount is computed based on the selected intra-bridge phase shift computation algorithm. The control circuitry, in some examples, is configured to select the intra-bridge phase shift computation algorithm by determining whether the voltage transfer ratio satisfies a threshold, and selecting the intra-bridge phase shift computation algorithm from among the stored intra-bridge phase shift computation algorithms based on whether the voltage transfer ratio satisfies the threshold. In another example, the control circuitry is further configured to select the intra-bridge phase shift computation algorithm by selecting a first intra-bridge phase shift computation algorithm in response to determining that the voltage transfer ratio satisfies the threshold, and selecting a second intra-bridge phase shift computation algorithm, distinct from the first intra-bridge phase shift computation algorithm, in response to determining that the voltage transfer ratio does not satisfy the threshold.

The control circuitry, in a further example, is configured to determine a target effective phase shift based on a target power transfer amount, and compute the target intra-bridge phase shift amount further based at least in part on the target effective phase shift.

In one example, the control circuitry is configured to determine the output voltage by detecting, via the input port, a signal level at the output port of the dual active bridge converter that is coupled to a rechargeable battery.

The system, in some examples, further includes a second input port configured to receive power from an electrical power grid. In such examples, the control circuitry may be configured to determine an input voltage of the dual active bridge converter by detecting a signal level at the second input port and/or retrieving an input voltage value stored in the memory.

The control circuitry, in a further example, is configured to cause the plurality of switch control signals to switch according to the time-based switching sequence by selectively switching in succession respective ones of the plurality of control signals at respective times within a time period based on the selected intra-bridge phase shift amount.

In accordance with another aspect of the present disclosure a method for adaptive control of a dual active bridge converter is described. An output voltage of a dual active bridge converter, which is coupled to a charging port of an electric vehicle, is periodically sensed. In response to sensing a change in the output voltage, a target intra-bridge phase shift amount between two bridges of the dual active bridge converter is computed based at least in part on the sensed output voltage. The target intra-bridge phase shift amount is computed based on a rule stored in memory that maps output voltages to respective target intra-bridge phase shift amounts associated with zero voltage switching for the respective output voltages. Based on the target intra-bridge phase shift amount, a time-based zero voltage switching sequence is generated. Switch control signals, which are provided to respective switches of the dual active bridge converter, are caused to switch according to the time-based switching sequence to compensate for variations in the output voltage.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
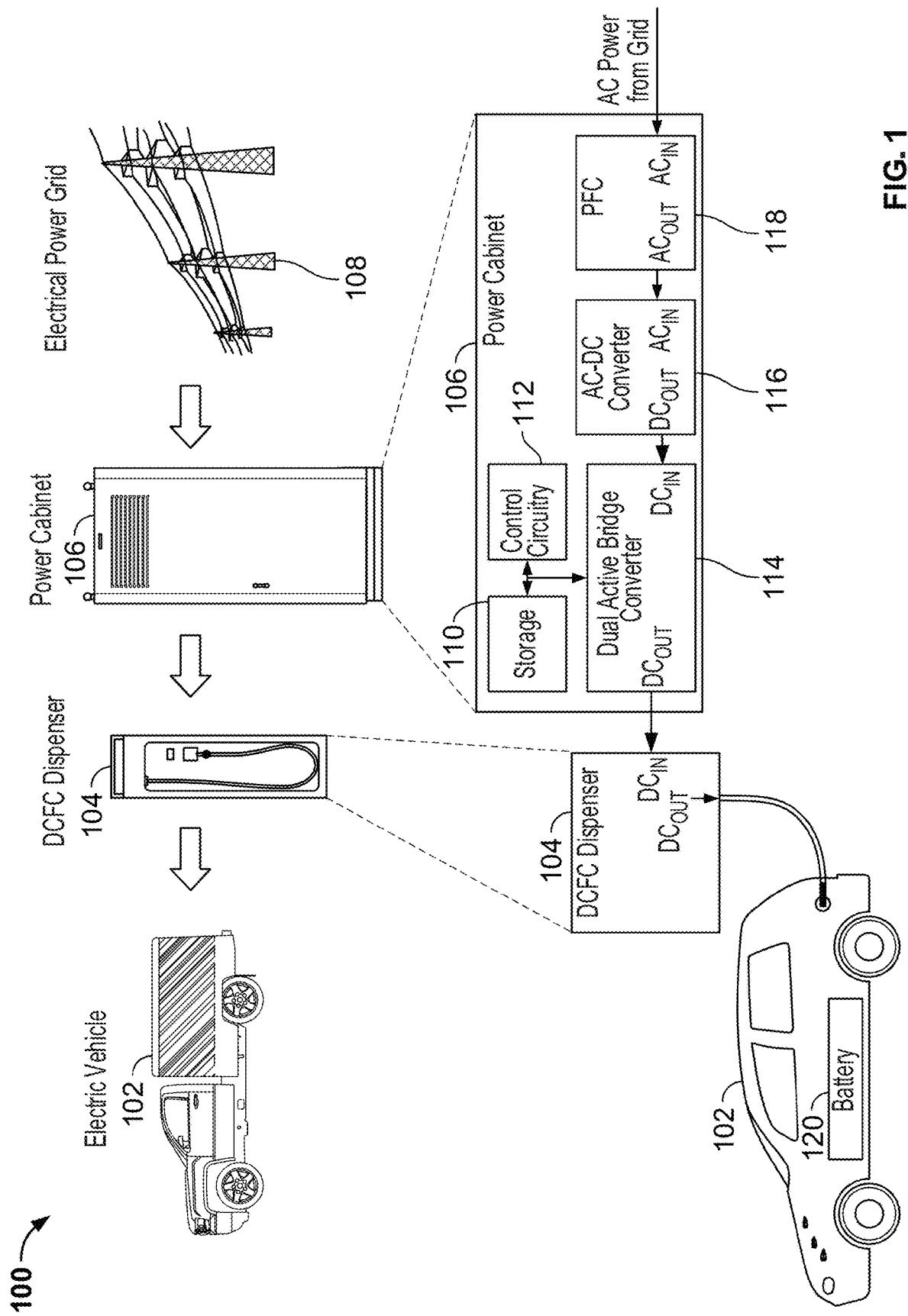
FIG. 1 shows an illustrative block diagram of an electric vehicle charging system including a dual active bridge converter with adaptive control, in accordance with some embodiments of the disclosure.

FIG. 1 shows an illustrative block diagram of an electric vehicle charging system 100, in accordance with some embodiments of the disclosure. System 100 includes electric vehicle 102, direct current fast charger (DCFC) dispenser 104, power cabinet 106, and electrical power grid 108. Electric vehicle 102 includes rechargeable battery 120. Power cabinet 106 includes storage 110, control circuitry 112, dual active bridge (DAB) converter 114, AC-DC converter 116, and power factor correction (PFC) circuitry 118. Power cabinet 106 is coupled to electrical power grid 108 via one or more wired electrical power signal paths, by which electrical power grid 108 provides alternating current (AC) electrical power, such as in the form of a three-phase 480 volt (V) 60 hertz (Hz) signal, to power cabinet 106. PFC circuitry 118 performs power factor correction upon the AC electrical power received from electrical power grid 108, and outputs a power factor corrected AC power signal to AC-DC converter 116. AC-DC converter 116 converts the power factor corrected AC power signal received from PFC circuitry 118 into a DC signal, such as a signal fixed at a voltage in a range from 200 to 920 V and a maximum current of 500 amps (A) at a maximum power of 300 kilowatts (kW). AC-DC converter 116 provides the DC signal to DAB converter 114, which converts the received DC signal into an output DC signal that is provided, by way of DCFC dispenser 104, to charge battery 120 via a charging port of electric vehicle 102. As described in further detail below, control circuitry 112, which is electrically coupled to storage 110 and DAB converter 114, is configured to adaptively control DAB converter 114 to transfer power to battery 120 in an efficient manner by compensating for variations in load conditions and/or variations in input voltage that may occur during a charging cycle.

Figure 2:
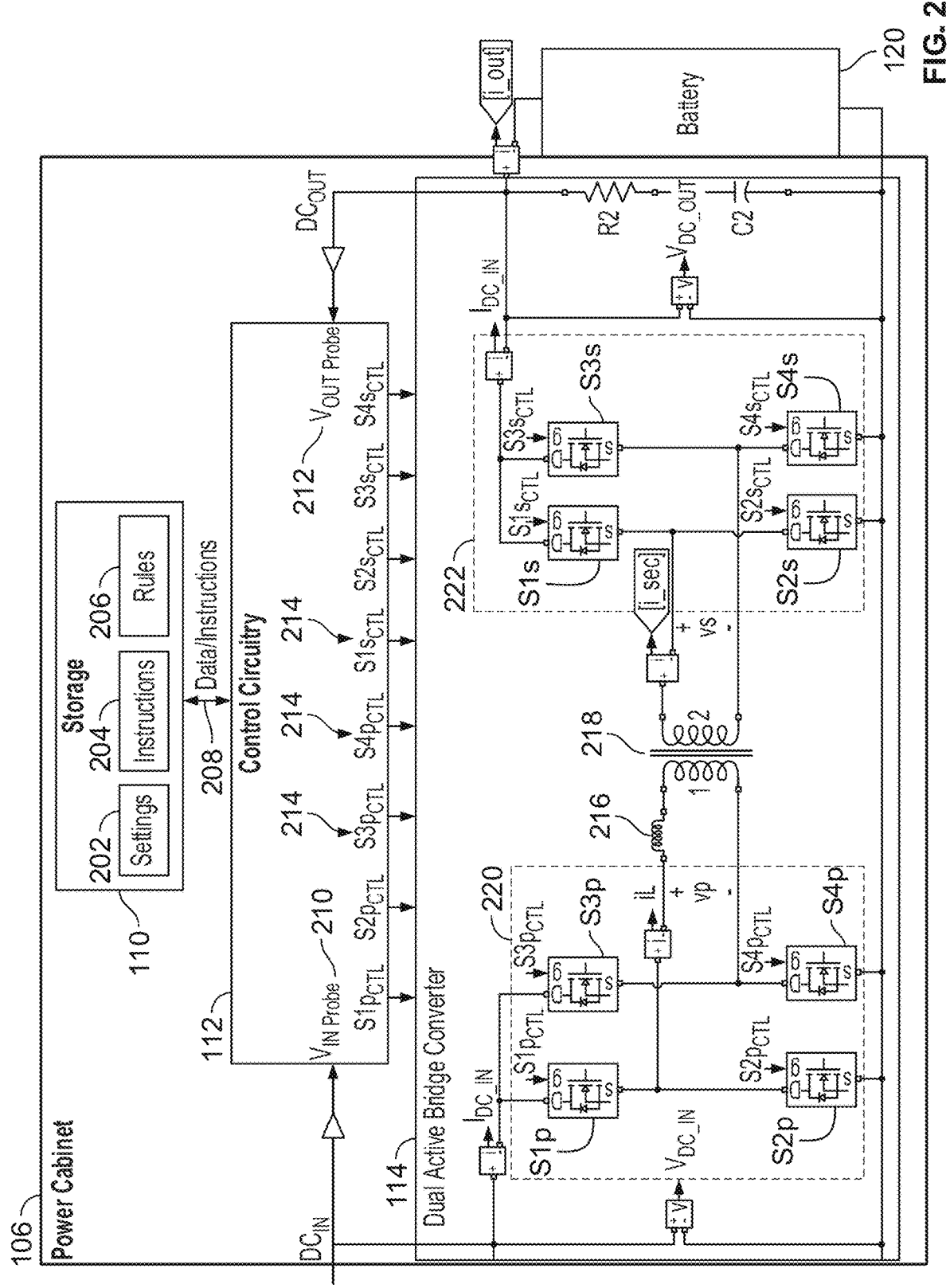
FIG. 2 is an illustrative block diagram showing additional details of a direct current fast charger dispenser of the electric vehicle charging system of FIG. 1, in accordance with some embodiments of the disclosure.

FIG. 2 is an illustrative block diagram showing additional details of some components of power cabinet 106, in accordance with some embodiments of the disclosure. Storage 110 may be an electronic storage device. As referred to herein, the phrase "electronic storage device" or "storage device" should be understood to mean any device for storing electronic data, computer software, or firmware, such as random-access memory, read-only memory, solid state devices, or any other suitable fixed or removable storage devices, and/or any combination of the same. Storage 110 may be used to store various types of instructions, rules, and/or other types of data. In some embodiments, control circuitry 112 executes instructions for an application stored in storage 110. Specifically, control circuitry 112 may be instructed by the application to perform the functions discussed herein. In some implementations, any action performed by control circuitry 112 may be based on instructions received from the application. For example, the application may be implemented as software or a set of executable instructions that may be stored in storage 110 and executed by control circuitry 112.

Storage 110, in some aspects, stores settings 202, instructions 204, and rules 206. Example types of settings 202 may include power transfer settings, such as a maximum power transfer level for DAB converter 114; an effective or fundamental phase shift ($\phi_f$) predetermined to achieve a certain power transfer capability for DAB converter 114, a switching frequency for DAB converter 114, and/or other types of settings. Example types of rules 206 may include computational constants (e.g., values of inductors and/or transformers of DAB converter 114), look-up-tables that match output voltage levels with corresponding intra-bridge phase shift amounts designed to yield zero voltage switching, equations for computing intra-bridge phase shifts, and/or other types of information or data. In some aspects, instructions 204 are executed by control circuitry 112 to implement steps of various methods described herein.

DAB converter 114 includes transformer 218, a primary side bridge 220 and a secondary side bridge 222. Primary side bridge is coupled to a primary side of transformer 218 via series inductor 216. Secondary side bridge 222 is coupled to a secondary side of transformer 218. As used herein, the "primary side" of DAB converter 114 refers to the portion of DAB converter 114 appearing to the left of transformer 218 in FIG. 2, and the "secondary side" of DAB converter 114 refers to the portion of DAB converter 114 appearing to the right of transformer 218 in FIG. 2. As used herein, Vp and Vs refer to the voltage on the primary side of transformer 218 and the voltage on the secondary side of transformer 218, respectively. DAB converter 114 also includes primary side switches S1p, S2p, S3p, and S4p located on the primary side of DAB converter 114 and secondary side switches S1s, S2s, S3s, and S4s located on the secondary side of DAB converter 114. Switches S1p, S2p, S3p, S4p, S1s, S2s, S3s, and S4s may be any suitable type of electronic switch, such as a field effect transistor (FET)-based switch, that can be switched on/closed (e.g., during which current is permitted to be conducted between its source and drain terminal) or off/open (e.g., during which current is effectively prevented from being conducted between its source and drain terminal) by changing a logic level of the control signal provided to its gate terminal, for example from a logic-high to a logic-low.

Control circuitry 112 includes storage interface port 208, first input port 210 ($V_{IN\ Probe}$), second input port 212 ($V_{OUT\ Probe}$), and multiple output ports 214. Control circuitry 112 is configured to transmit and receive instructions, settings, rules, and/or other types of data to and from storage 110 via storage interface port 208. Control circuitry 112 is configured to sense an input voltage ($V_{IN}$) of DAB converter 114 via first input port 210. Control circuitry 112 is configured to sense an output voltage ($V_O$) of DAB converter 114 via second input port 212 ($V_{OUT\ Probe}$).

Output ports 214 include primary switching control ports $S1p_{CTL}$, $S2p_{CTL}$, $S3p_{CTL}$, and $S4p_{CTL}$, by which control circuitry 112 provides respective switching control signals to respective switching control ports $S1p_{CTL}$, $S2p_{CTL}$, $S3p_{CTL}$, and $S4p_{CTL}$ of primary side switches S1p, S2p, S3p, and S4p. Output ports 214 also include secondary switching control ports $S1s_{CTL}$, $S2s_{CTL}$, $S3s_{CTL}$, and $S4s_{CTL}$, by which control circuitry 112 provides respective switching control signals to respective switching control ports $S1s_{CTL}$, $S2s_{CTL}$, S3$s_{CTL}$, and S4$s_{CTL}$ of secondary side switches S1s, S2s, S3s, and S4s, respectively. Complete signal paths from switching control ports S1$p_{CTL}$, S2$p_{CTL}$, S3$p_{CTL}$, S4$p_{CTL}$, S1$s_{CTL}$, S2$s_{CTL}$, S3$s_{CTL}$, and S4$s_{CTL}$ of control circuitry 112 to S1$p_{CTL}$, S2$p_{CTL}$, S3$p_{CTL}$, S4$p_{CTL}$, S1$s_{CTL}$, S2$s_{CTL}$, S3$s_{CTL}$, and S4$s_{CTL}$ of DAB 114 are omitted from FIG. 2 for clarity. Nonetheless, switching control ports S1$p_{CTL}$, S2$p_{CTL}$, S3$p_{CTL}$, S4$p_{CTL}$, S1$s_{CTL}$, S2$s_{CTL}$, S3$s_{CTL}$, and S4$s_{CTL}$ of control circuitry 112 are indeed coupled to S1$p_{CTL}$, S2$p_{CTL}$, S3$p_{CTL}$, S4$p_{CTL}$, S1$s_{CTL}$, S2$s_{CTL}$, S3$s_{CTL}$, and S4$s_{CTL}$ of DAB 114 via respective signal paths. As described in further detail below, in some aspects, control circuitry 112 is configured to compute, based at least in part on the sensed output voltage ($V_O$) and/or the sensed input voltage ($V_{IN}$), a target intra-bridge phase shift amount between two bridges of the DAB converter 114. Control circuitry 112 then causes the various switching control signals, as described in further detail below, to switch according to a time-based switching sequence based on the target intra-bridge phase shift amount to compensate for variations in the input voltage ($V_{IN}$) and/or output voltage ($V_O$) of DAB converter 114 (e.g., owing to output load variations).

Figure 3A:
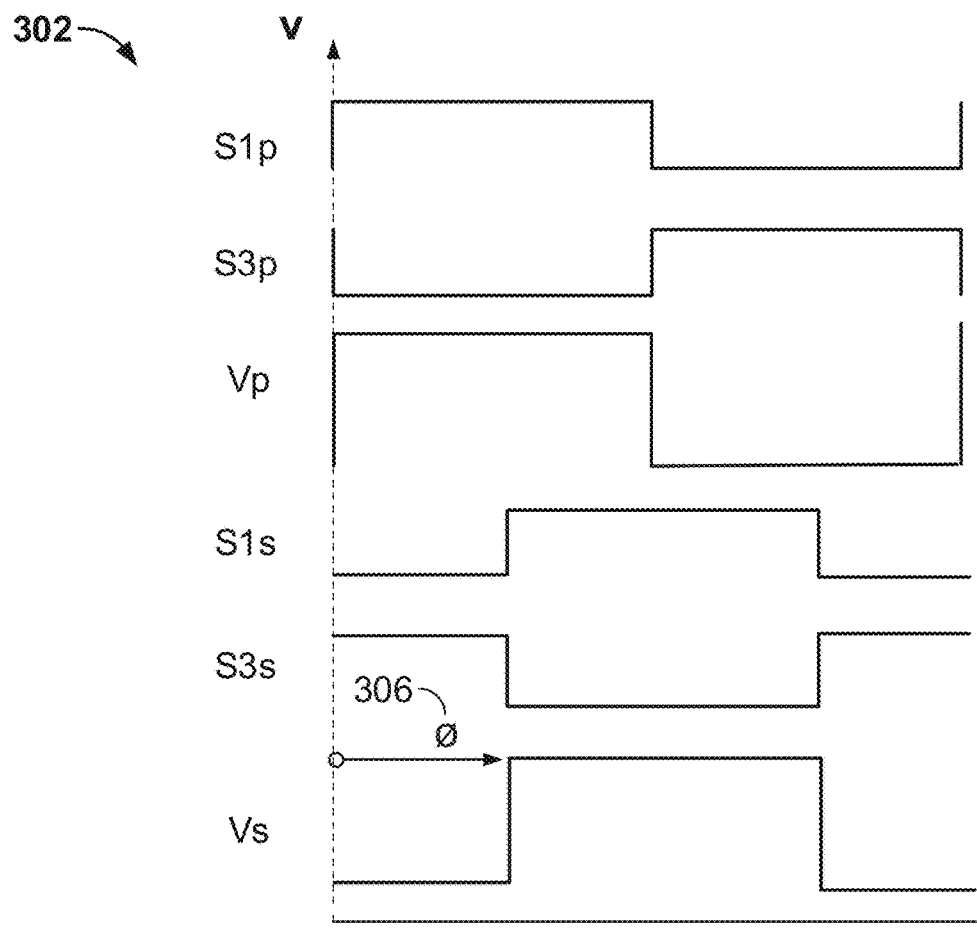
FIG. 3A depicts an illustrative voltage timing diagram of switching control signals of a dual active bridge converter without intra-bridge phase shifting, in accordance with some embodiments of the disclosure.
Figure 3B:
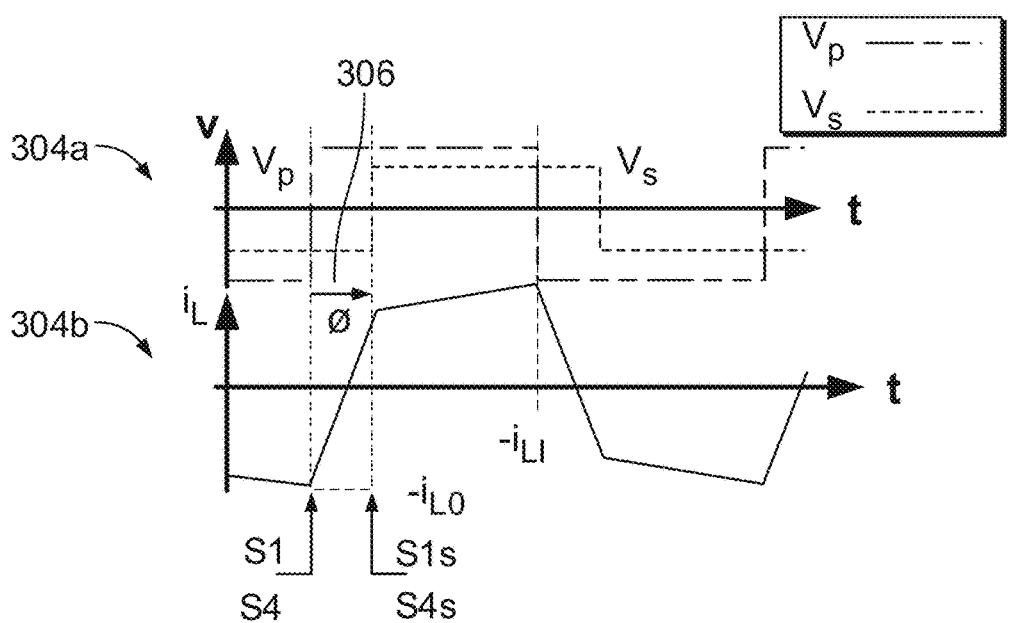
FIG. 3B depicts an illustrative voltage and current timing diagram of a dual active bridge converter without intra-bridge phase shifting, in accordance with some embodiments of the disclosure.

FIG. 3A depicts an illustrative voltage timing diagram 302 of switching control signals S1p, S3p, S1s, S3s of a conventional DAB converter, without intra-bridge phase shifting, and of primary (Vp) and secondary (Vs) voltages of transformer 218. FIG. 3B depicts an illustrative voltage timing diagram 304a and current timing diagram 304b of a conventional DAB converter, without intra-bridge phase shifting, that corresponds to the switching control signals shown in FIG. 3A. Unless otherwise stated herein, switching signal S2p is complementary of switching signal S1p, switching signal S4p is complementary of switching signal S3p, switching signal S2s is complementary of switching signal S1s, and switching signal S4s is complementary of switching signal S3s. For clarity, certain complementary signals are omitted from certain figures.

As shown in FIG. 3A, switching signal S1p switches logic levels at the same time, albeit in an opposite logic level direction (e.g., logic high-to-logic low versus logic low-to-logic high), as switching signal S3p, and switching signal S1s switches logic levels at the same time, albeit in an opposite logic level direction, as switching signal S3s. Although not shown in FIG. 3A, switching signal S2p (complementary to switching signal S1p) switches logic levels at the same time, albeit in an opposite logic level direction, as switching signal S4p (complementary to switching signal S3p), and switching signal S2s (complementary to switching signal S1s) switches logic levels at the same time, albeit in an opposite logic level direction, as switching signal S4s (complementary to switching signal S3s). Thus, in the example of FIG. 3A, there is no intra-bridge phase shift between the switching timing of switching signals S1p and S3p, and there is no intra-bridge phase shift between the switching timing of switching signals S1s and S3s. Likewise, in the example of FIG. 3A, there is no intra-bridge phase shift between the switching timing of switching signals S2p and S4p, and there is no intra-bridge phase shift between the switching timing of switching signals S2s and S4s. There is, however, a phase shift 306 defined by the timing difference between the time when switching signal S1p (or S4p) switches and the time when switching signal S1s (or S4s) switch. Among the disadvantages of the conventional DAB converter described in FIG. 3A and FIG. 3B is that it is unable to achieve zero voltage switching in light load conditions, and therefore yields low efficiency in light load conditions.

Figure 4:
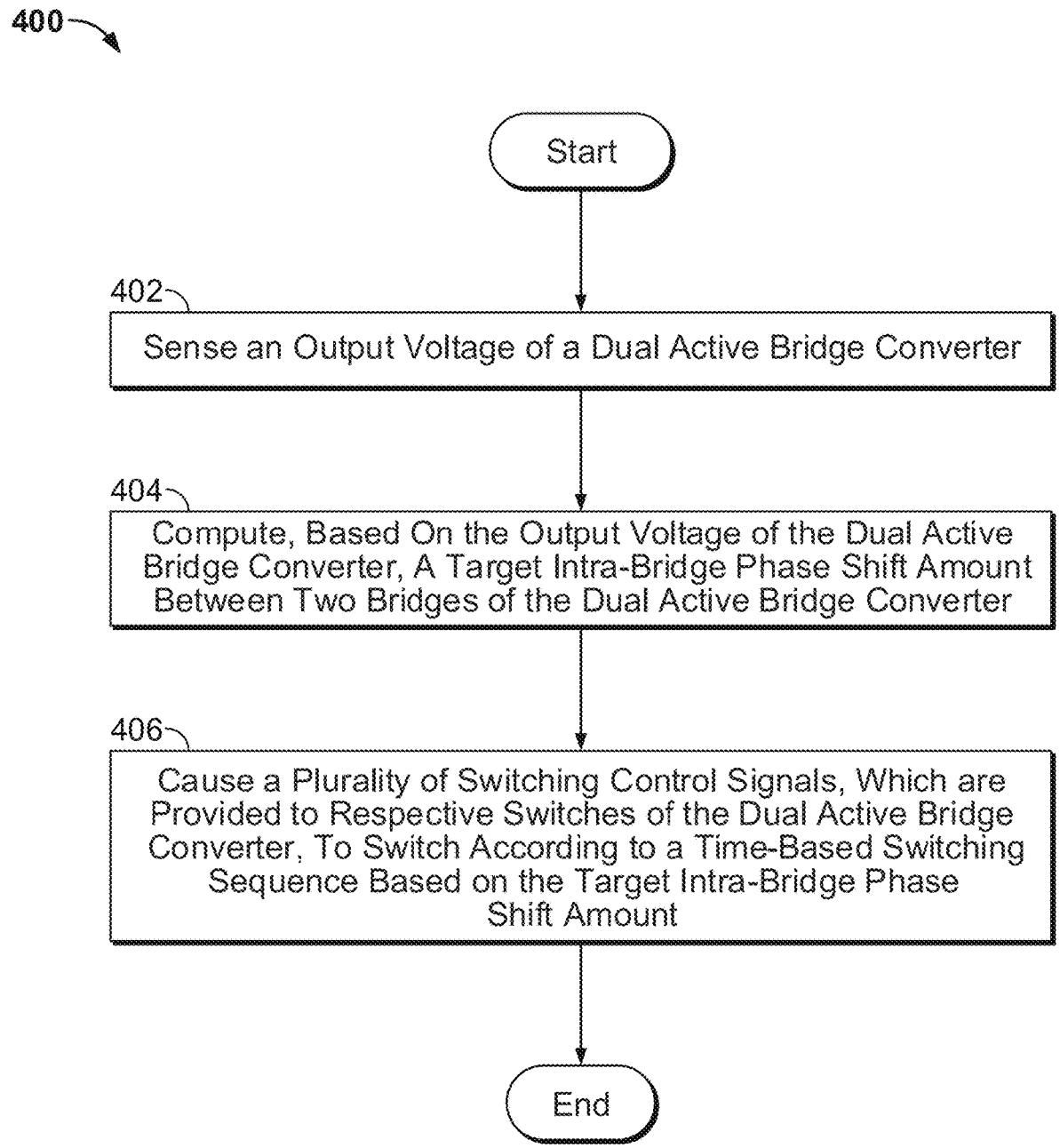
FIG. 4 depicts an illustrative flowchart of a process for adaptively controlling a dual active bridge converter, in accordance with some embodiments of the disclosure.

FIG. 4 depicts an illustrative flowchart of a process 400 for adaptively controlling DAB converter 114, in accordance with some embodiments of the disclosure. At 402, control circuitry 112 senses the output voltage ($V_O$) of DAB converter 114 via second input port 212 ($V_{OUT\ Probe}$).

At 404, control circuitry 112 computes, based at least in part on the output voltage sensed at 402, a target intra-bridge phase shift amount between two bridges 220 and 222 of DAB converter 114. The target intra-bridge phase shift amount, in one example, may be computed based on a rule 206 stored in memory 110 that maps output voltages to respective target intra-bridge phase shift amounts associated with zero voltage switching for the respective output voltages. The time-based switching sequence is a zero voltage switching sequence generated based on the target intra-bridge phase shift amount.

At 406, control circuitry 112 causes switching control signals S1p, S2p, S3p, S4p, S1s, S2s, S3s, and S4s, which are provided to respective switches of the DAB converter 114, to switch according to a time-based switching sequence based on the target intra-bridge phase shift amount that was computed at 404, to compensate for variations in the output voltage.

Figure 5:
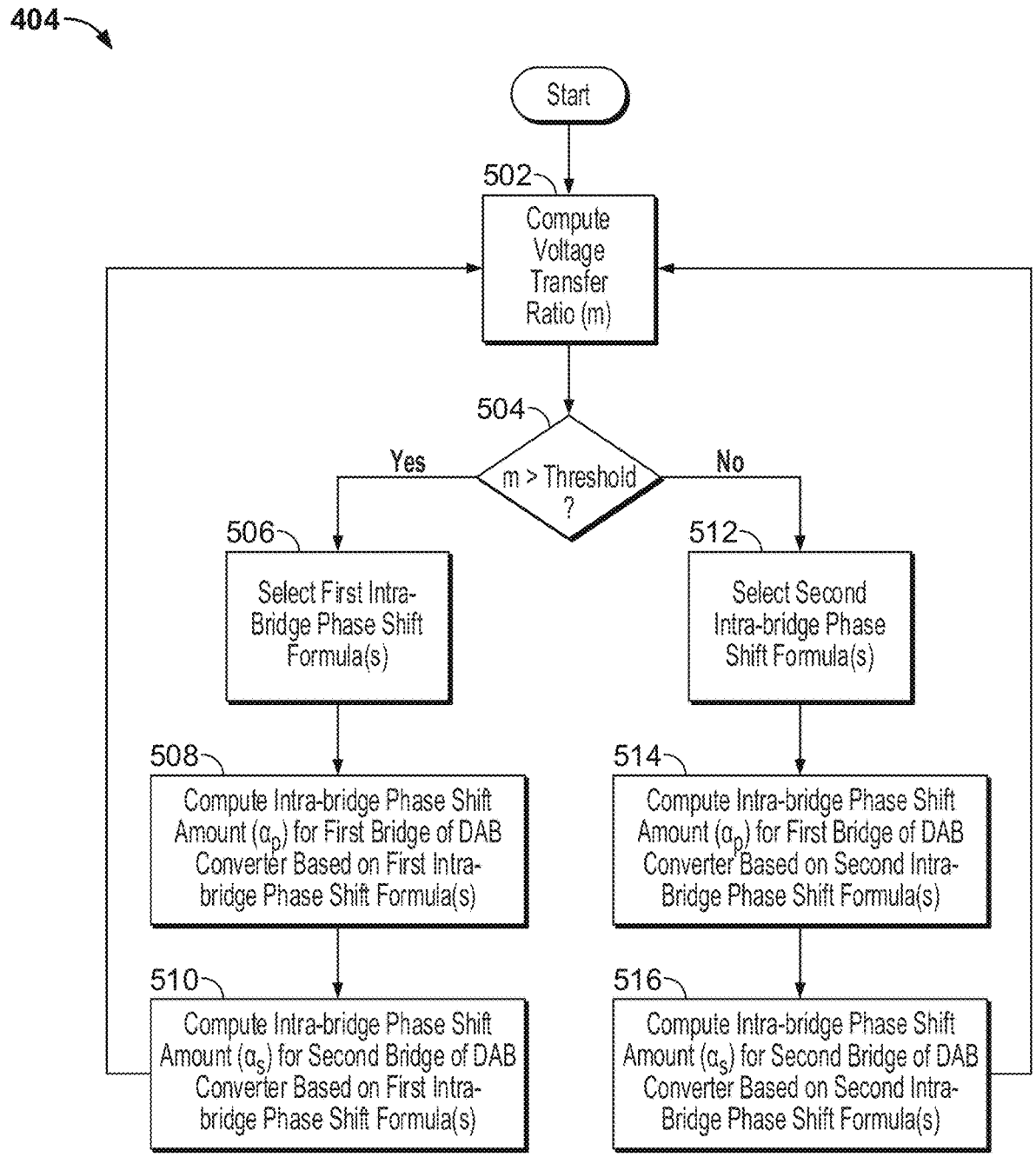
FIG. 5 depicts an illustrative flowchart of a process for computing a target intra-bridge phase shift amount for a dual active bridge converter, in accordance with some embodiments of the disclosure.

FIG. 5 depicts an illustrative flowchart of a process 404 for computing a target intra-bridge phase shift amount for a dual active bridge converter, in accordance with some embodiments of the disclosure. At 502, control circuitry 112 computes a voltage transfer ratio (m) based on the output voltage ($V_O$) and input voltage ($V_{IN}$) of DAB converter 114. Additional details regarding how control circuitry 112 computes voltage transfer ratio (m) are described below in connection with FIG. 6

In some examples, based on the voltage transfer ratio (m) computed at 502, control circuitry 112 selects one or more intra-bridge phase shift computation algorithms from among multiple intra-bridge phase shift computation algorithms stored in storage 110, with target intra-bridge phase shift amount(s) for bridge 220 and bridge 222 being computed (at 404 of FIG. 4) based on the selected intra-bridge phase shift computation algorithm(s). In various examples, the intra-bridge phase shift computation algorithms may be stored in storage 110 in the form of formulas, equations, discretized look-up tables, or in any other suitable manner.

At 504, control circuitry 112 determines whether the voltage transfer ratio (m) computed at 502 satisfies a threshold. In one example, control circuitry 112 compares the voltage transfer ratio (m) to a threshold by plugging the voltage transfer ratio (m) into expression (1) below $$\phi_f \le \frac{\pi|1-m|}{2}, \qquad (1)$$

where $\phi_f$ represents an effective or fundamental phase shift, predetermined to achieve a certain power transfer capability for DAB converter 114, and stored in and retrieved from storage 110. In such an example, control circuitry 112 determines whether the voltage transfer ratio (m) satisfies the threshold by determining whether expression (1) is satisfied for the given voltage transfer ratio (m) and effective phase shift ($\phi_f$). If the voltage transfer ratio (m) satisfies a threshold ("Yes" at 504), then control passes to 506 to operate in an operation region referred to herein as "Region 1." If, on the other hand, the voltage transfer ratio (m) does not satisfy the threshold ("No" at 504), then control passes to 512 to operate in an operation region referred to herein as "Region 2."

At 506, in the Region 1 operational mode, control circuitry 112 selects a first set of intra-bridge phase shift computation algorithms, equation (2) and (3) below, in response to determining that the voltage transfer ratio (m) satisfies the threshold.

$$\alpha_p = \pi - \frac{2m}{|1-m|}\phi_f \qquad (2)$$

$$\alpha_s = \pi - \frac{2}{|1-m|}\phi_f \qquad (3)$$

At 508, control circuitry 112 computes a first intra-bridge phase shift amount ($\alpha_{p\_Region1}$) for the first bridge 220 of DAB converter 114 based on the first intra-bridge phase shift computation algorithm, equation (2), selected at 506. At 510, control circuitry 112 computes a second intra-bridge phase shift amount ($\alpha_{s\_Region1}$) for the second bridge 222 of DAB converter 114 based on the first intra-bridge phase shift computation algorithm, equation (3), selected at 506. From 510, control then passes back to 502 to compute another voltage transfer ratio (m) based on a more recently sensed value of output voltage ($V_O$) of DAB converter 114. In this manner, process 404 facilitates an adaptive mechanism for periodically or continuously adapting the target intra-bridge phase shift amounts to compensate for variations in output ($V_O$) and/or input voltage ($V_{IN}$).

At 512, in the Region 2 operational mode, control circuitry 112 selects a second set of intra-bridge phase shift computation algorithms, equations (4) and (5) below, distinct from the first intra-bridge phase shift computation algorithms, in response to determining that the voltage transfer ratio (m) does not satisfy the threshold.

$$\alpha_p = (-2\phi_f + \pi)(1 - m/m) \qquad (4)$$

$$\alpha_s = (-2\phi_f + \pi)(m - 1) \qquad (5)$$

At 514, control circuitry 112 computes a third intra-bridge phase shift amount ($\alpha_{p\_Region2}$) for the first bridge 220 of DAB converter 114 based on the second intra-bridge phase shift computation algorithm, equation (4), selected at 512. At 516, control circuitry 112 computes a fourth intra-bridge phase shift amount ($\alpha_{s\_Region2}$) for the second bridge 222 of DAB converter 114 based on the second intra-bridge phase shift computation algorithm, equation (5), selected at 512. From 516, control then passes back to 502 to compute another voltage transfer ratio (m) based on a more recently sensed value of output voltage ($V_O$) of DAB converter 114. In this manner, process 404 facilitates an adaptive mechanism for periodically or continuously adapting the target intra-bridge phase shift amounts to compensate for variations in output ($V_O$) and/or input voltage ($V_{IN}$).

Figure 6:
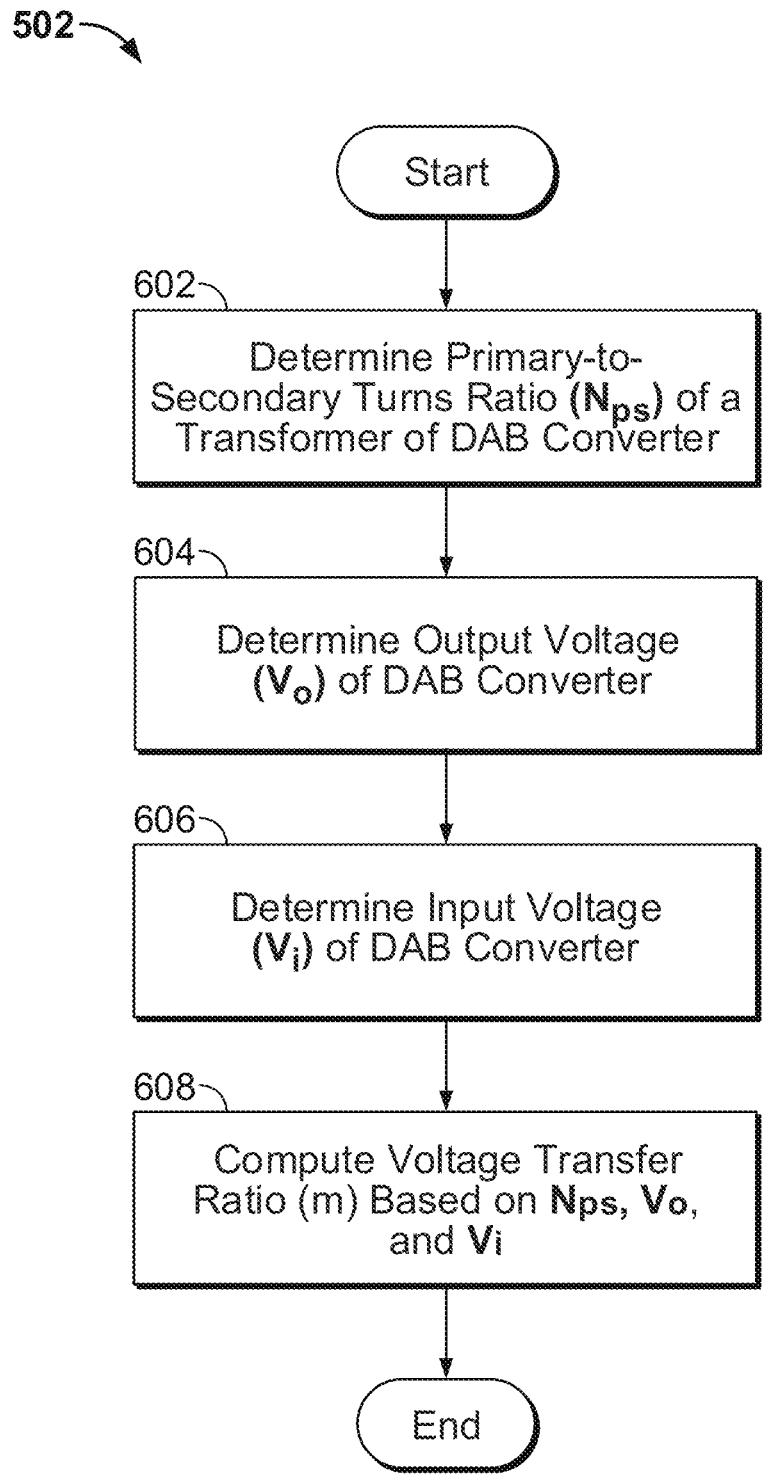
FIG. 6 depicts an illustrative flowchart of a process for computing a voltage transfer ratio for adaptive dual active bridge converter control, in accordance with some embodiments of the disclosure.

FIG. 6 depicts an illustrative flowchart of a process 502 for computing a voltage transfer ratio for adaptive dual active bridge converter control, in accordance with some embodiments of the disclosure. At 602, control circuitry 112 determines a primary-to-secondary turns ratio ($N_{ps}$) of transformer 218. In some examples, the primary-to-secondary turns ratio ($N_{ps}$) may be a predetermined scalar value, based on the particular transformer 218 installed in DAB converter 114, and stored in storage 110 for retrieval by control circuitry 112 at 602.

At 604, control circuitry 112 determines the output voltage ($V_O$) of DAB converter 114, for instance, by detecting a signal level at the output port of the dual active bridge converter that is coupled to rechargeable battery 120.

At 606, control circuitry 112 determines the input voltage ($V_I$) of DAB converter 114, for instance, by detecting a signal level at an input port of the dual active bridge converter that receives power from an electrical power grid and/or retrieving a predetermined input voltage value stored in the memory.

At 608, control circuitry 112 computes the voltage transfer ratio (m). In one example, control circuitry 112 computes the voltage transfer ratio (m) based on equation (6) below $$m = \frac{N_{ps}V_O}{V_{IN}}. \qquad (6)$$

In another example, for instance, where primary-to-secondary turns ratio ($N_{ps}$) and/or input voltage ($V_{IN}$) are predetermined for DAB converter 114, control circuitry 112 may compute voltage transfer ratio (m) based solely on output voltage ($V_O$) and/or may compute voltage transfer ratio (m) by scaling output voltage ($V_O$) based on one or more scalar factors stored in storage 110 based on the predetermined primary-to-secondary turns ratio ($N_{ps}$) and/or input voltage ($V_{IN}$).

Figure 7:
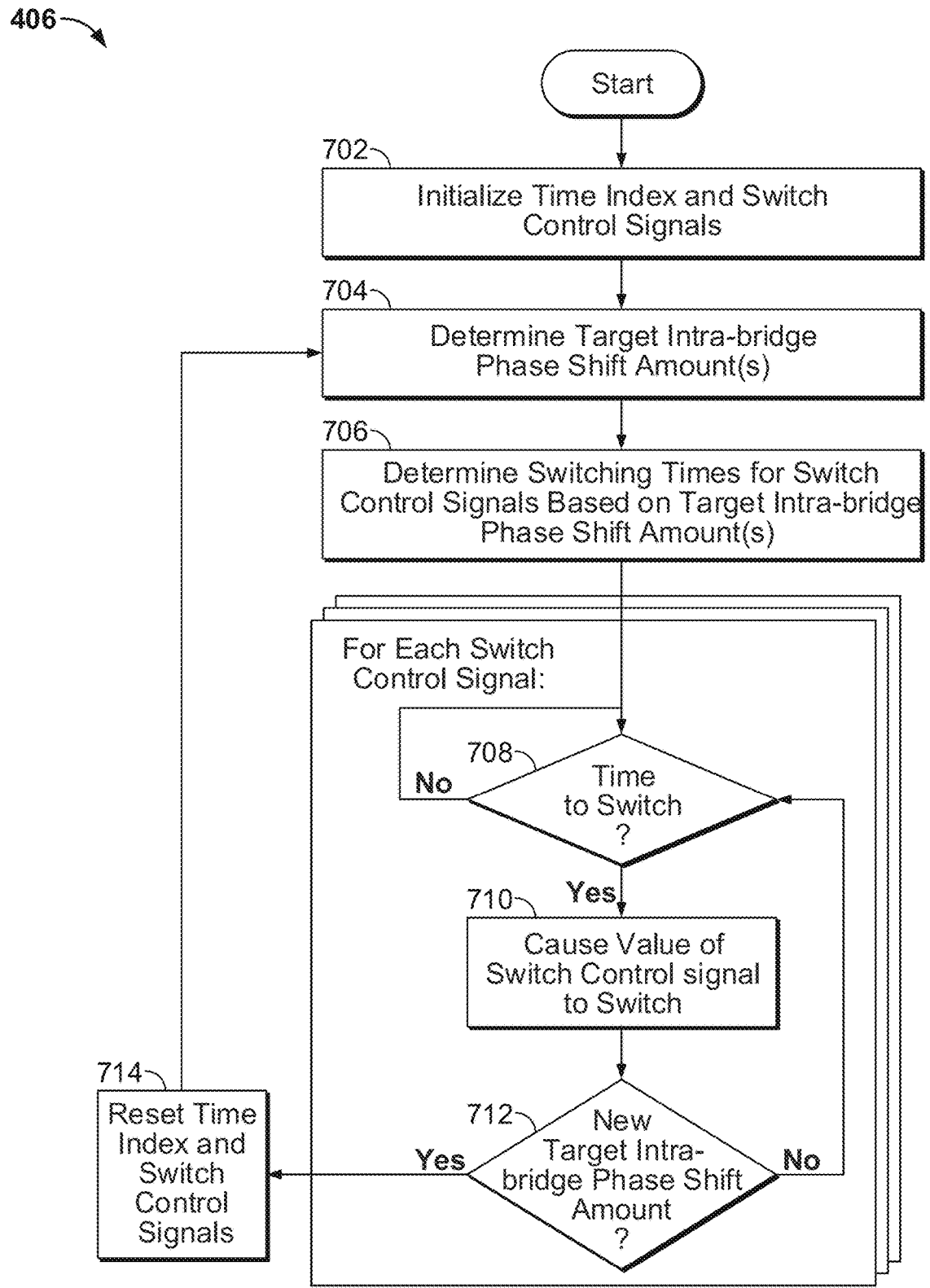
FIG. 7 depicts an illustrative flowchart of a process for causing switching control signals to switch based on a target intra-bridge phase shift amount, in accordance with some embodiments of the disclosure.

FIG. 7 depicts an illustrative flowchart of a process 406 for causing switching control signals to switch according to a time-based switching sequence based on the target intra-bridge phase shift amount(s) computed at 404, to compensate for variations in the output voltage. In some examples, control circuitry 112 generates the time-based switching sequence based on the target intra-bridge phase shift amount(s) computed at 404 by utilizing a discretized time period (e.g., the inverse of a predetermined switching frequency stored for DAB converter 114 in storage 110), and determining time indices (t) at the respective switching times within each time period for each of switching control signals S1p, S2p, S3p, S4p, S1s, S2s, S3s, and S4s. Control circuitry 112 then stores in storage 110 a table including the time indices at which each of switching control signals that result in the target intra-bridge phase shift amount(s) computed at 404.

Figure 8:
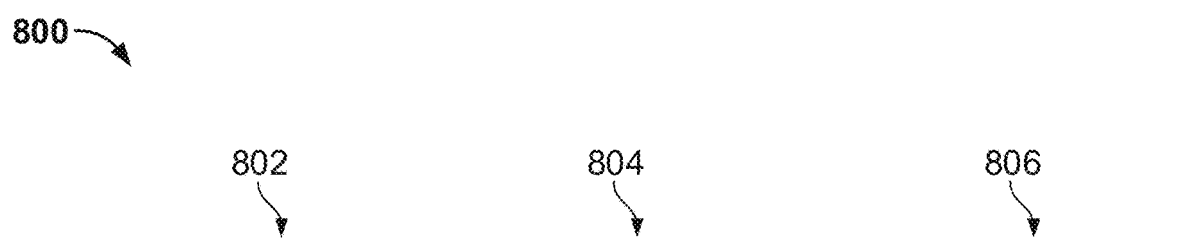
FIG. 8 depicts an illustrative time-based switching sequence for utilization in controlling switching switches of a dual active bridge converter, in accordance with some embodiments of the disclosure.

FIG. 8 shows an illustrative time-based switching sequence table 800 which may be stored in storage 110 for utilization by control circuitry 112 in controlling switching switches of DAB converter 114, in accordance with some embodiments of the disclosure. Table 800 includes time indices 802, along with corresponding switching control signal identifiers 804, and logic level switching commands 806 that collectively represent the time-based switching sequence that may be repetitively stepped through to yield the target intra-bridge phase shifts amount(s) computed at 404.

At 702, at the beginning of a switching cycle time period, control circuitry 112 initializes the values of a time index (t) and the values of switching control signals S1p, S2p, S3p, S4p, S1s, S2s, S3s, and S4s. At 704, control circuitry 112 determines one or more target intra-bridge phase shift amount(s) in the manner described above in connection with 404 of FIG. 4.

At 706, control circuitry 112 determines switching times for switching control signals S1p, S2p, S3p, S4p, S1s, S2s, S3s, and S4s, based on the target intra-bridge phase shift amounts. In some examples, from 706, control passes to one or more executions of 708 to 712, such as one parallel execution for each switching control signal S1p, S2p, S3p, S4p, S1s, S2s, S3s, and S4s.

At 708, control circuitry 112 determines, based on the current time index value (t), whether it is time to switch the respective switching control signal from among switching control signals S1p, S2p, S3p, S4p, S1s, S2s, S3s, and S4s. For example, control circuitry 112 may determine whether it is time to switch the respective switching control signal by comparing a current time value (relative to one time period or cycle based on the switching frequency for DAB converter 114) to the time indices in stored table 800. If control circuitry 112 determines that it is not time to switch ("No") at 708, then control remains at 708 to check based on the incrementing time index whether or when it becomes time to switch the respective switching control signal. If or when control circuitry 112 determines that it is time to switch ("Yes") at 708, then control passes to 710.

At 710, control circuitry 112 causes a value of the respective switching control signal from among S1p, S2p, S3p, S4p, S1s, S2s, S3s, and S4s to switch logic levels according to the time-sequence stored in table 800.

At 712, control circuitry 112 determines whether new target intra-bridge phase shift amounts have been computed at 404. If control circuitry 112 determines that no new target intra-bridge phase shift amounts have been computed at 404 ("No" at 712), then control passes back to 708 to determine whether it is time to switch another switching control signal. If control circuitry 112 determines that new target intra-bridge phase shift amounts have been computed at 404 ("Yes" at 712), then control passes to 714.

At 714, at the beginning of another switching cycle time period, control circuitry 112 initializes the values of a time index (t) and the values of switching control signals S1p, S2p, S3p, S4p, S1s, S2s, S3s, and S4s. Control then passes back to 704 to determine one or more updated target intra-bridge phase shift amount(s).

Figure 9:
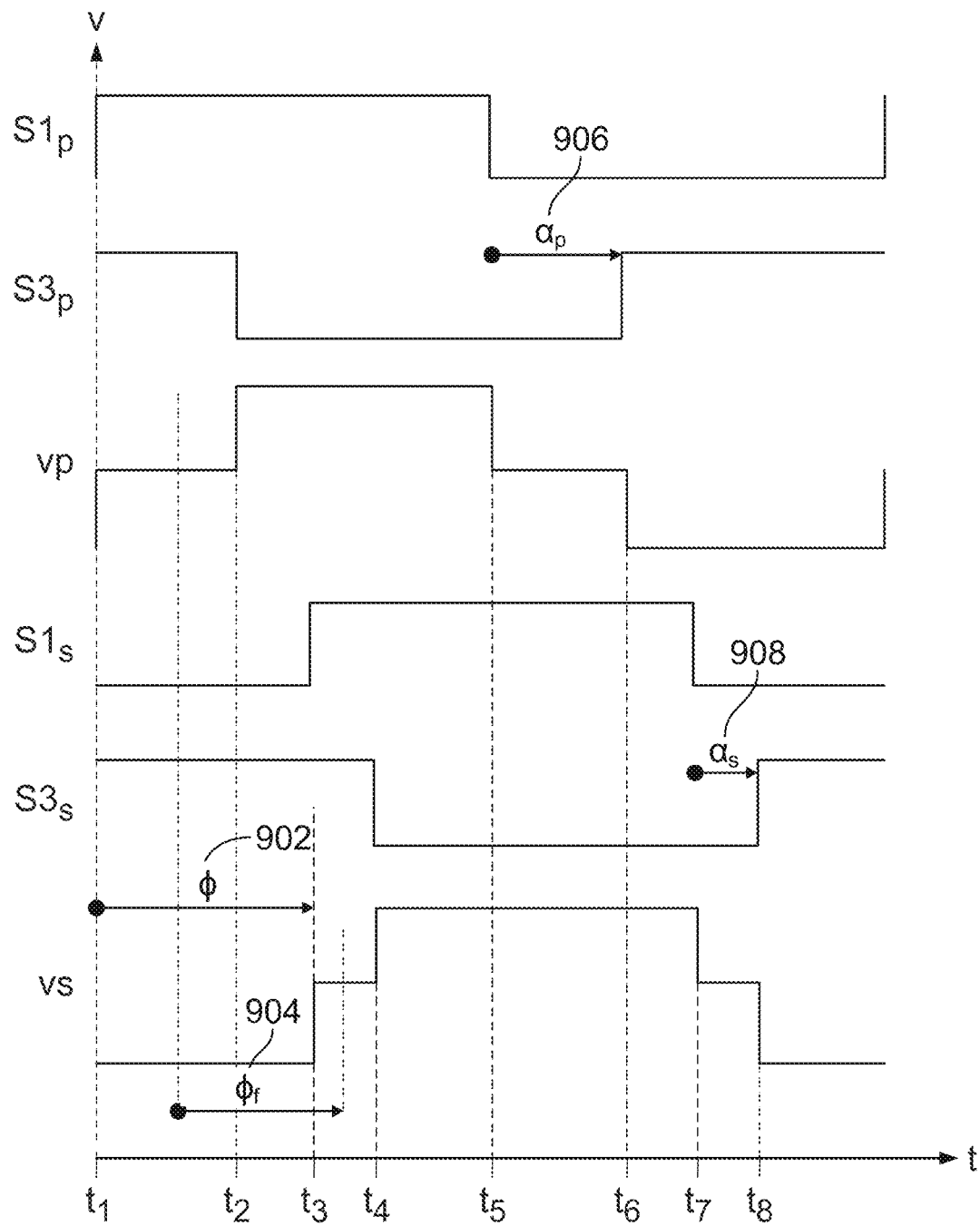
FIG. 9 depicts an illustrative voltage timing diagram of switching control signals of a dual active bridge converter with intra-bridge phase shifting, in accordance with some embodiments of the disclosure.

FIG. 9 depicts an illustrative voltage timing diagram 900 of switching control signals S1p, S3p, S1s, S3s of DAB converter 114, with intra-bridge phase shifting, and of primary (Vp) and secondary (Vs) voltages of transformer 218, in accordance with some embodiments of the disclosure. Unless otherwise stated herein, switching signal S2p is complementary of switching signal S1p, switching signal S4p is complementary of switching signal S3p, switching signal S2s is complementary of switching signal S1s, and switching signal S4s is complementary of switching signal S3s. For clarity, certain complementary signals are omitted from certain figures.

FIG. 9 includes time indices that correspond to time indices 802 shown in FIG. 8. As shown in FIG. 9, in contrast to the switching scheme shown in FIG. 3A, switching control signal S1p switches logic levels at a different time than switching control signal S3p (i.e., shifted by intra-bridge phase shift amount ($\alpha_p$) 906), and switching control signal S1s switches logic levels at a different time than switching signal S3s (i.e., shifted by intra-bridge phase shift amount ($\alpha_s$) 908). Although not shown in FIG. 9, switching signal S2p (complementary to switching signal S1p) switches logic levels at the same time, albeit in an opposite logic level direction, as switching signal S4p (complementary to switching signal S3p), and switching signal S2s (complementary to switching signal S1s) switches logic levels at the same time, albeit in an opposite logic level direction, as switching signal S4s (complementary to switching signal S3s). Thus, in the example of FIG. 9, there is one intra-bridge phase shift ($\alpha_p$) 906 between the switching timing of switching signals S1p and S3p, and there is another intra-bridge phase shift ($\alpha_s$) 908 between the switching timing of switching signals S1s and S3s. Likewise, in the example of FIG. 9, there is an intra-bridge phase shift ($\alpha_p$) 906 between the switching timing of switching signals S2p and S4p, and there is an intra-bridge phase shift ($\alpha_s$) 908 between the switching timing of switching signals S2s and S4s. There is also a phase shift ($\phi$) 902 defined by the timing difference between the time when switching signal S1p (or S4p) switches and the time when switching signal S1s (or S4s) switches. Additionally, there is an effective phase shift ($\phi_f$) 904 which relates to phase shift ($\phi$) 902 according to the equation $\phi_f = \phi - \alpha_p/2 + \alpha_s/2$, where $0 < \phi_f < \pi/2$, $0 < \alpha_p < \pi$, and $0 < \alpha_s < \pi$. Among the advantages of the DAB converter 114 described in FIG. 9 is that it is able to achieve zero voltage switching across a wide range of load conditions, including in light load conditions, and therefore yields high efficiency across a wide range of load conditions, including in light load conditions.

Figure 10A:
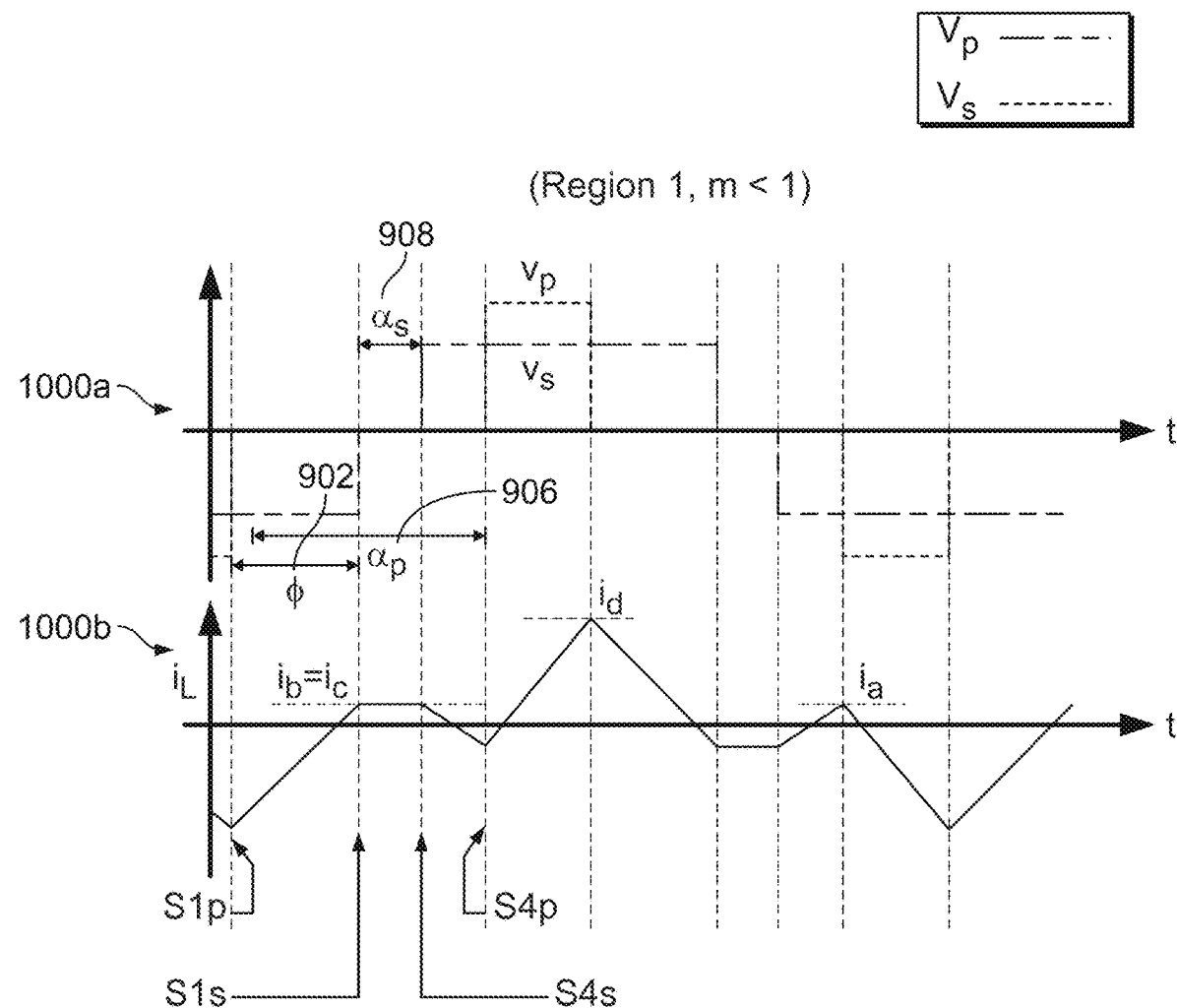
FIG. 10A depicts an illustrative voltage and current timing diagram of a dual active bridge converter with intra-bridge phase shifting for a first effective phase shift range in a first region of operation, in accordance with some embodiments of the disclosure.

Reference is now made to FIGS. 10A to 10D, which depict voltage and current timing diagrams for multiple ranges of operation (Region 1 and Region 2, described above) and for multiple ranges of voltage transfer ratio (m), to describe the derivation of the intra-bridge phase shift computation algorithms (equations (2), (3), (4), and (5)) described herein. FIG. 10A depicts an illustrative voltage 1000a and current 1000b timing diagram of DAB converter 114 with intra-bridge phase shifting operating in the first operational region (Region 1) for a first range of voltage transfer ratio (m) (where voltage transfer ratio (m)<1), in accordance with some embodiments of the disclosure. Equations (7), (8), (9), and (10) correspond to the current values $i_{rms}$ (not shown in FIG. 10A) and $i_a$, $i_b$, $i_c$, and $i_d$, shown in FIG. 10A for operation in Region 1 with voltage transfer ratio (m)<1:

$$i_a = \frac{V_{in}}{2 \cdot X_l} \cdot [-2m\phi_f + (1-m)\pi - (1-m)\alpha_p], \quad (7)$$

$$i_b = i_c = \frac{V_{in}}{2 \cdot X_l} \cdot [-(1-m)\pi + \alpha_p - m\alpha_s], \quad (8)$$

$$i_d = \frac{V_{in}}{2 \cdot X_l} \cdot [2m\phi_f + (1-m)\pi - (1-m)\alpha_p], \text{ and} \quad (9)$$

$$I_{rms} = I_d \sqrt{\frac{\pi + \phi_f - \alpha_p/2 - \alpha_s/2}{3\pi}}. \quad (10)$$

Setting current values $i_a$, $i_b$, and $i_c$ all equal to zero to minimize circulating current and solving for intra-bridge phase shift amounts ($\alpha_p$) and ($\alpha_s$) yields equations (11) and (12):

$$\alpha_p = \pi - \frac{2m}{1-m}\phi_f \text{ and} \quad (11)$$

$$\alpha_s = \pi - \frac{2}{1-m}\phi_f. \quad (12)$$

Figure 10B:
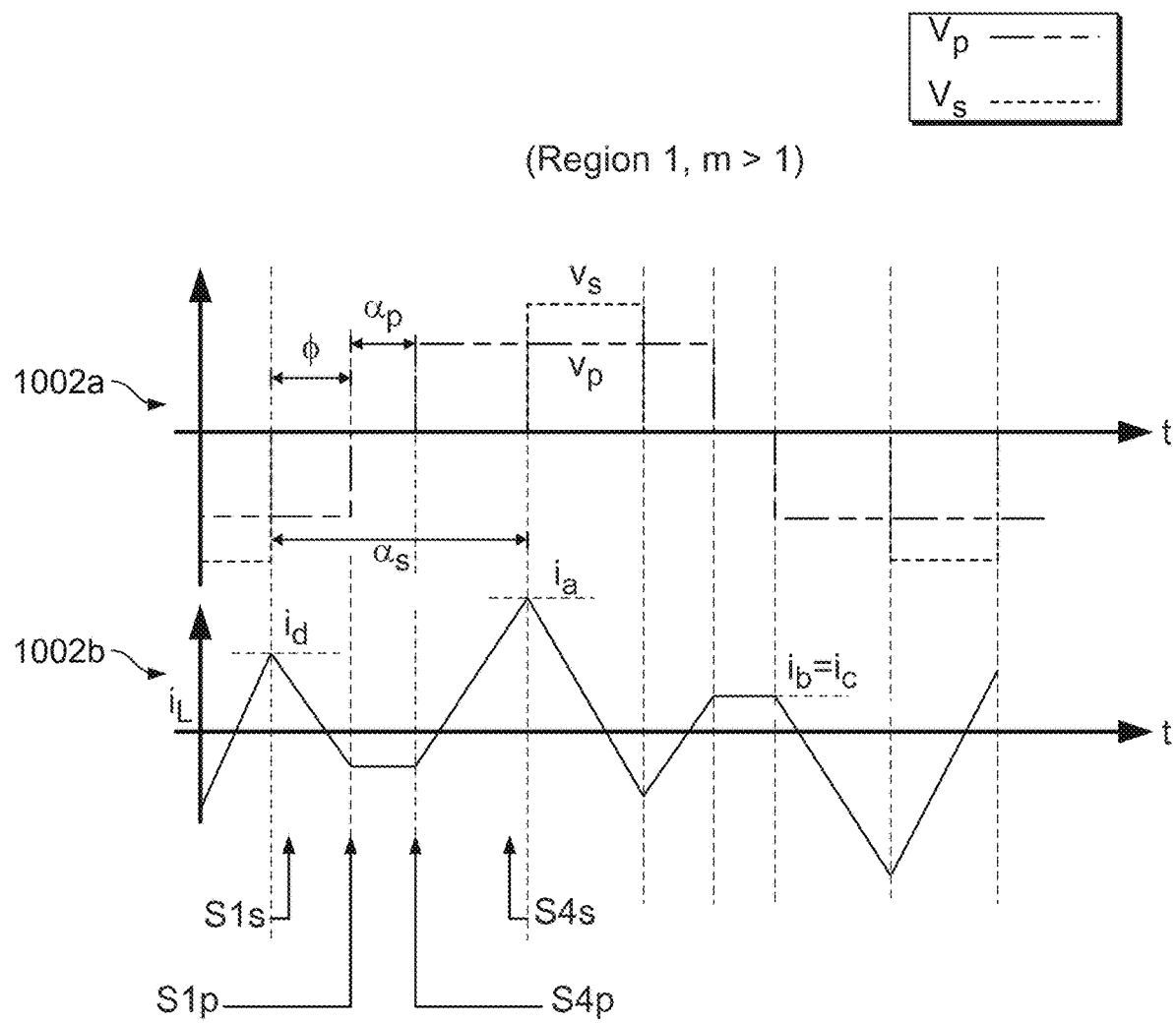
FIG. 10B depicts an illustrative voltage and current timing diagram of a dual active bridge converter with intra-bridge phase shifting for a second effective phase shift range in the first region of operation, in accordance with some embodiments of the disclosure.

FIG. 10B depicts an illustrative voltage 1002a and current 1002b timing diagram of DAB converter 114 with intra-bridge phase shifting operating in the first operational region (Region 1) for a second range of voltage transfer ratio (m) (where voltage transfer ratio (m)>1), in accordance with some embodiments of the disclosure. Equations (13), (14), (15), and (16) correspond to the current values $i_{rms}$ (not shown in FIG. 10B) and $i_a$, $i_b$, $i_c$, and $i_d$, shown in FIG. 10B for operation in Region 1 with voltage transfer ratio (m)>1:

$$i_a = \frac{V_{in}}{2 \cdot X_l} \cdot [2\phi_f + (m-1)\pi - (m-1)\alpha_s], \quad (13)$$

$$i_b = i_c = \frac{V_{in}}{2 \cdot X_l} \cdot [-(m-1)\pi - \alpha_p + m\alpha_s], \quad (14)$$

$$i_d = \frac{V_{in}}{2 \cdot X_l} \cdot [2\phi_f - (m-1)\pi + (m-1)\alpha_s], \text{ and} \quad (15)$$

$$I_{rms} = I_a \sqrt{\frac{\pi + \phi_f - \alpha_p/2 - \alpha_s/2}{3\pi}} \quad (16)$$

Setting current values $i_a$, $i_b$, and $i_c$, all equal to zero to minimize circulating current and solving for intra-bridge phase shift amounts ($\alpha_p$) and ($\alpha_s$) yields equations (17) and (18):

$$\alpha_p = \pi - \frac{2m}{m-1}\phi_f \text{ and} \quad (17)$$

$$\alpha_s = \pi - \frac{2}{m-1}\phi_f. \quad (18)$$

Figure 10C:
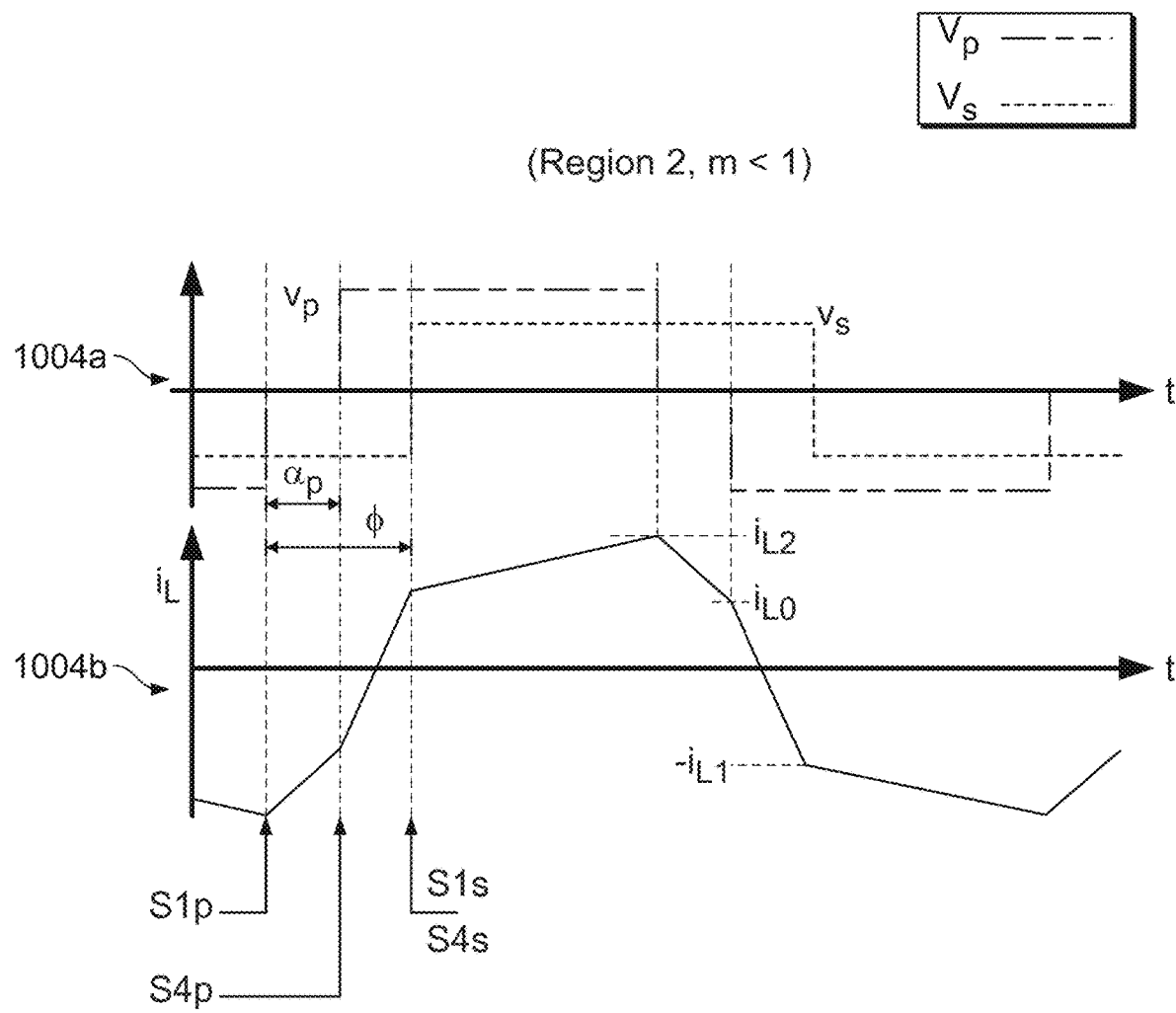
FIG. 10C depicts an illustrative voltage and current timing diagram of a dual active bridge converter with intra-bridge phase shifting for the first effective phase shift range in a second region of operation, in accordance with some embodiments of the disclosure.

FIG. 10C depicts an illustrative voltage 1004a and current 1004b timing diagram of DAB converter 114 with intra-bridge phase shifting operating in the second operational region (Region 2) for the first range of voltage transfer ratio (m) (where voltage transfer ratio (m)<1), in accordance with some embodiments of the disclosure. For this range of operation, equations (19) and (20) provide intra-bridge phase shift amounts ($\alpha_p$) and ($\alpha_s$) that minimize circulating current:

$$\alpha_s = 0, \text{ and} \quad (19)$$

interpolating $\alpha_p$ between [π(1−m),0] for $\phi_f$ in [π(1−m)/2,π/2]. (20)

Figure 10D:
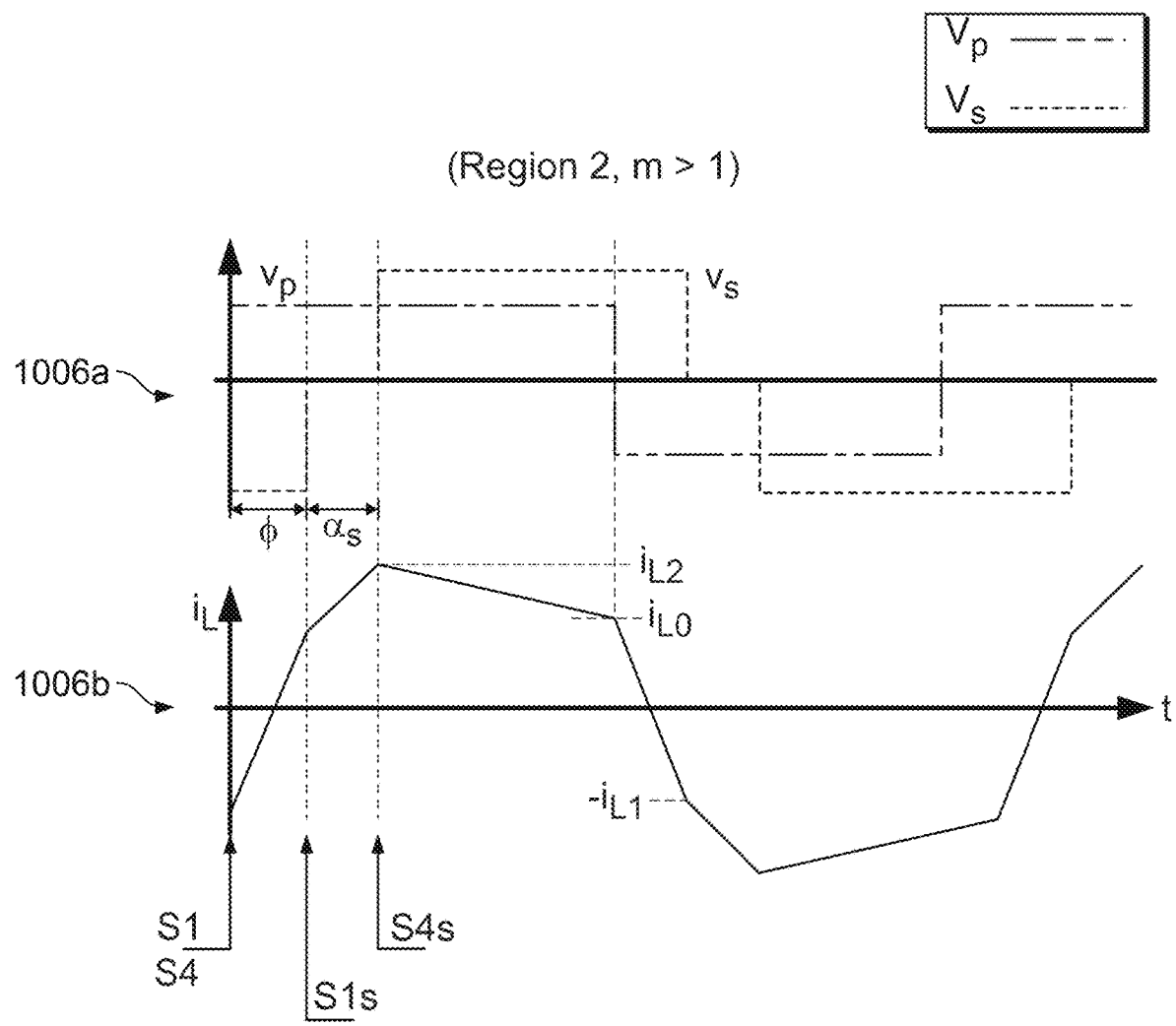
FIG. 10D depicts an illustrative voltage and current timing diagram of a dual active bridge converter with intra-bridge phase shifting for the second effective phase shift range in the second region of operation, in accordance with some embodiments of the disclosure.

FIG. 10D depicts an illustrative voltage 1006a and current 1006b timing diagram of DAB converter 114 with intra-bridge phase shifting operating in the second operational region (Region 2) for the second range of voltage transfer ratio (m) (where voltage transfer ratio (m)>1), in accordance with some embodiments of the disclosure. For this range of operation, equations (21) and (22) provide intra-bridge phase shift amounts ($\alpha_p$) and ($\alpha_s$) that minimize circulating current:

$$\alpha_p = 0, \text{ and} \quad (21)$$

interpolating $\alpha_s$ between [π(1−1/m),0] for $\phi_f$ in [π(1−1/m)/2,π/2]. (22)

Equations (11), (12), (17), (18), (19), (20), (21), and (22), may be generalized by utilizing equations (2) and (3) described above for the Region 1 operational mode and utilizing equations (4) and (5) described above for the Region 2 operational mode, where ($\alpha_p$)≥0 and ($\alpha_s$)≥0.

Figure 11:
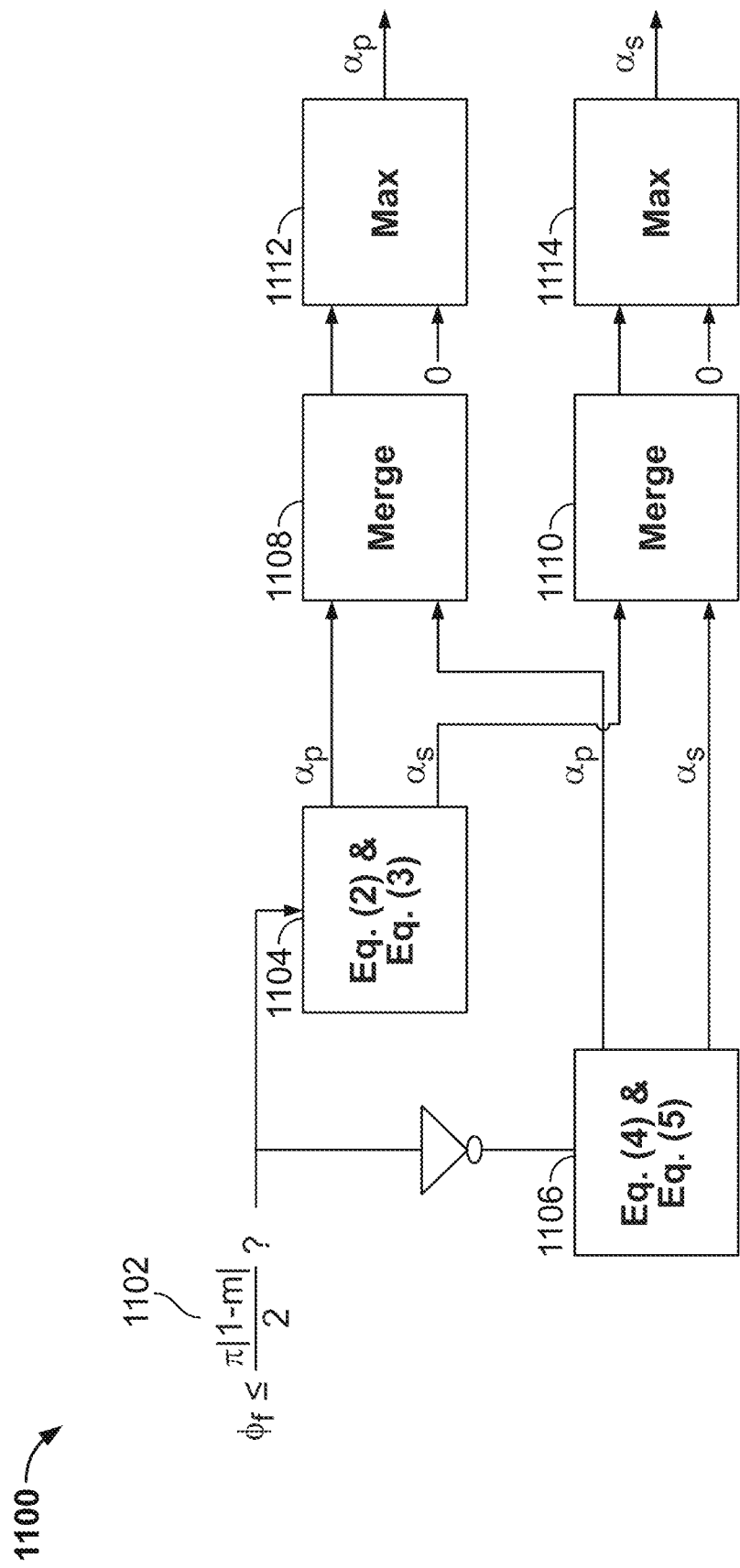
FIG. 11 depicts an illustrative structure for adaptively controlling a dual active bridge converter, in accordance with some embodiments of the disclosure.

FIG. 11 depicts an illustrative structure 1100 for adaptively controlling DAB converter 114, in accordance with some embodiments of the disclosure. At 1102, a determination is made based on effective phase shift ($\phi_f$) and voltage transfer ratio (m) as to whether to operate in Region 1 or Region 2. If it is determined at 1102 to operate in Region 1, then at 1104 equations (2) and (3) are enabled (e.g., utilized) and at 1106 equations (4) and (5) are disabled (e.g., not utilized). At 1108, the first intra-bridge phase shift ($\alpha_p$) computed at 1104 or 1106, as the case may be, is selected for utilization. Likewise, at 1110, the second intra-bridge phase shift ($\alpha_s$) computed at 1104 or 1106, as the case may be, is selected for utilization. At 1112 and 1114, respective maximization functions are executed upon the first ($\alpha_p$) and second ($\alpha_s$) intra-bridge phase shift amounts to utilize respective non-negative values for the first ($\alpha_p$) and second ($\alpha_s$) intra-bridge phase shift amounts.

Figure 12:
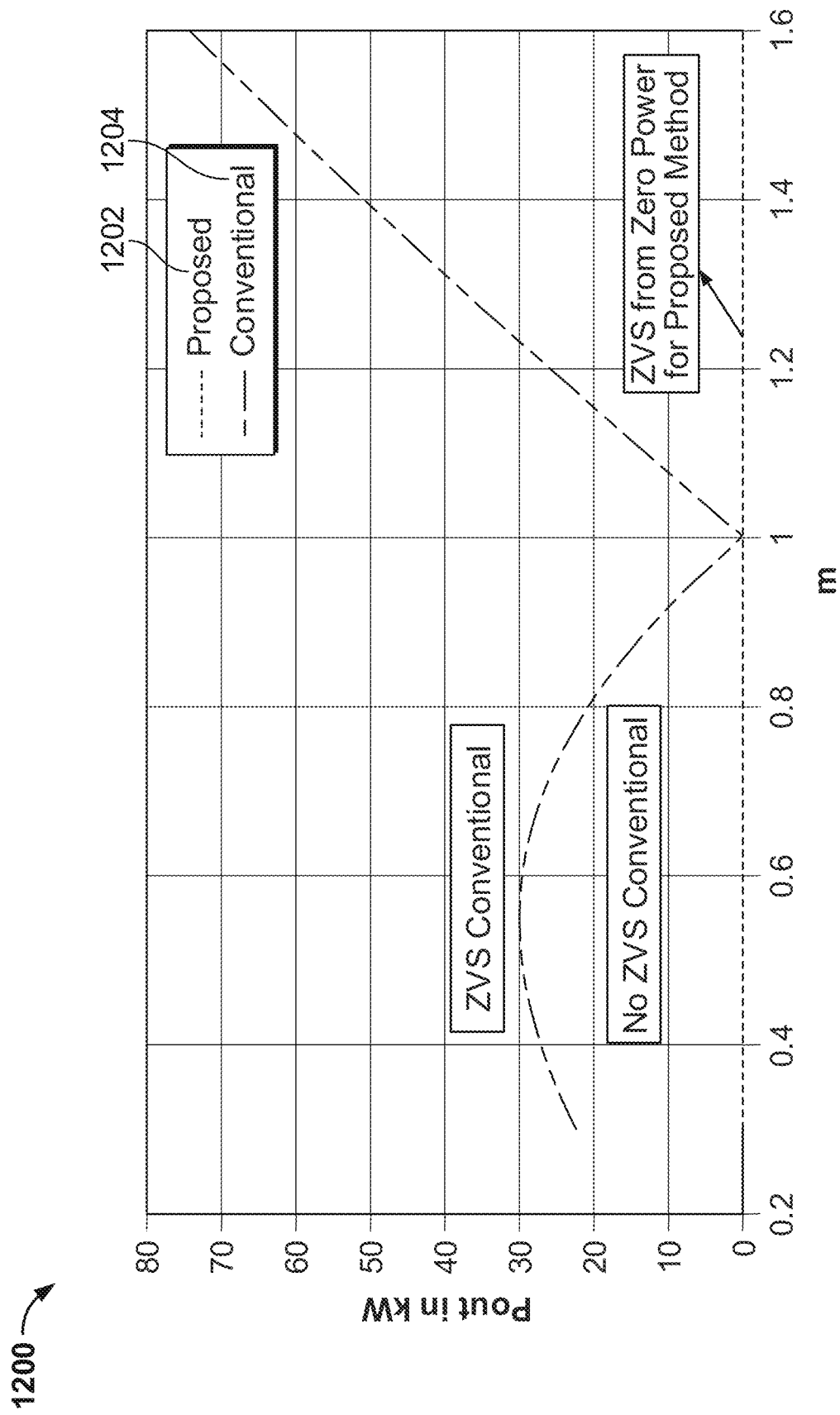
FIG. 12 depicts an illustrative plot comparing respective zero voltage switching performances of a dual active bridge converter with intra-bridge phase shifting and a dual active bridge converter without intra-bridge phase shifting, in accordance with some embodiments of the disclosure.

FIG. 12 depicts an illustrative plot 1200 comparing a zero voltage switching performance 1204 of a dual active bridge converter without intra-bridge phase shifting and a zero voltage switching performance 1202 of a dual active bridge converter with intra-bridge phase shifting in accordance with some embodiments of the disclosure. As is apparent in FIG. 12, the dual active bridge converter with intra-bridge phase shifting 1202 achieves zero voltage switching operation for all values of voltage transfer ratio (m) (or for all values of a varying output voltage) and from zero power. The dual active bridge converter without intra-bridge phase shifting 1204, on the other hand, only achieves zero voltage switching at zero power for a limited value of voltage transfer ratio (m).

Figure 13:
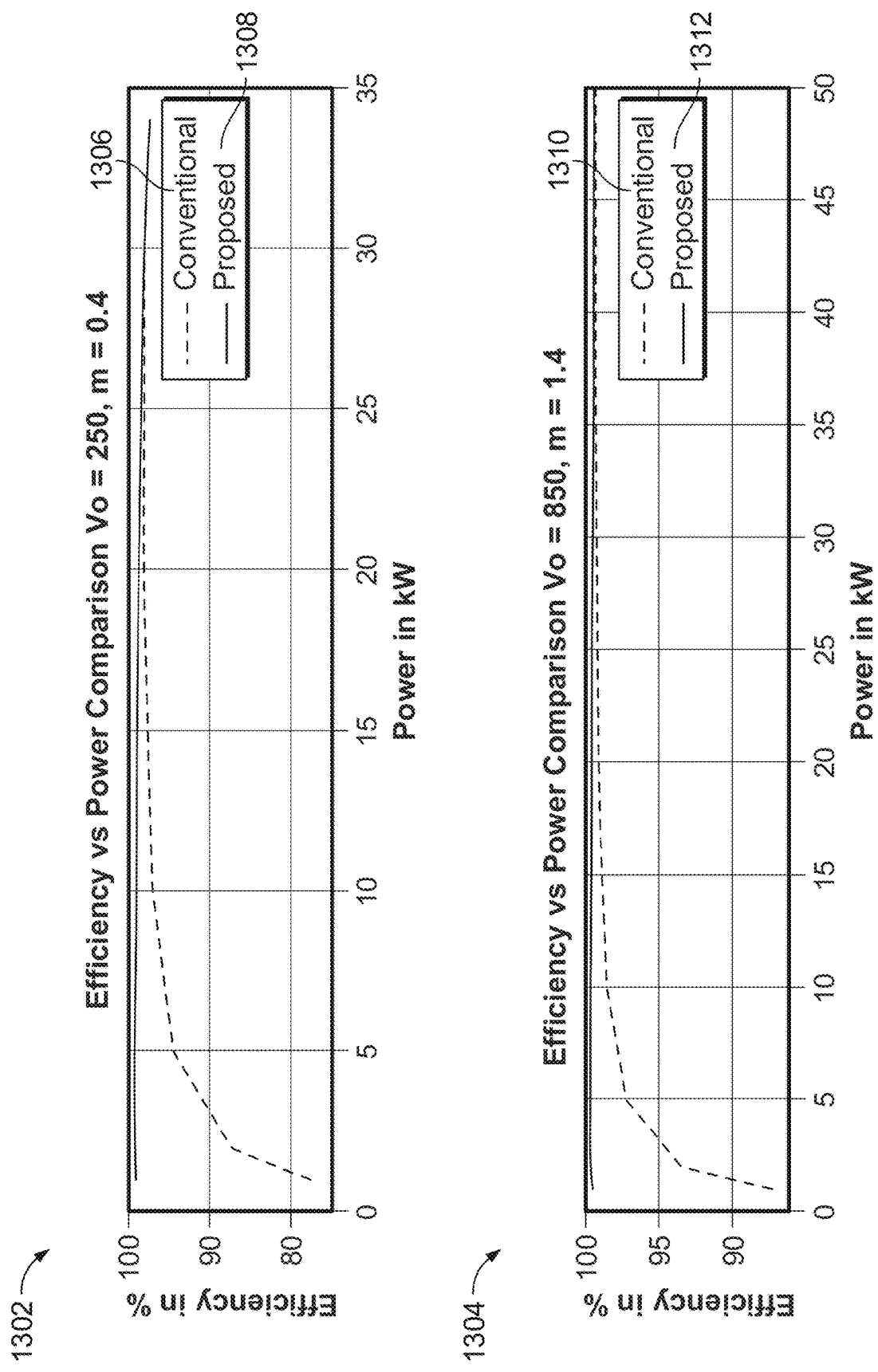
FIG. 13 depicts illustrative plots comparing respective efficiency versus output power performances of a dual active bridge converter with intra-bridge phase shifting and a dual active bridge converter without intra-bridge phase shifting, in accordance with some embodiments of the disclosure.

FIG. 13 depicts illustrative plots 1302 and 1304 comparing respective efficiency versus output power performances 1306, 1308, 1310, and 1312, of a dual active bridge converter with intra-bridge phase shifting (1308, 1312) and a dual active bridge converter without intra-bridge phase shifting (1306, 1310), in accordance with some embodiments of the disclosure. As is apparent in both plots 1302 and 1304, the dual active bridge converter with intra-bridge phase described herein yields a significant increase in efficiency, particularly in light load conditions for both m<1 and m>1.

Among the advantages of DAB converter 114 is that it yields improved efficiency by extending the zero voltage switching range of operation across a wide range of load conditions, as the following description demonstrates. With reference to FIG. 10A, for operation in Region 1 with voltage transfer ratio (m)<1, the inductance current direction for zero voltage switching performance of each switch is provided in Table 1.

TABLE 1

| Switch(es) | Inductance Current Direction for ZVS Performance |
|---|---|
| $S_{1p}(S_{2p})$ | $I_d > 0$ |
| $S_{4p}(S_{3p})$ | $I_a > 0$ |
| $S_{1s}(S_{2s})$ | $I_b > 0$ |
| $S_{4s}(S_{3s})$ | $I_c > 0$ |

Current values are given by equations (23), (24), and (25) below:

$$i_a = \frac{V_{in}}{2 \cdot X_l} \cdot [-2m\phi_f + (1-m)\pi - (1-m)\alpha_p] \quad (23)$$

$$i_b = i_c = \frac{V_{in}}{2 \cdot X_l} \cdot [-(1-m)\pi + \alpha_p - m\alpha_s] \quad (24)$$

$$i_d = \frac{V_{in}}{2 \cdot X_l} \cdot [2m\phi_f + (1-m)\pi - (1-m)\alpha_p] \quad (25)$$

Zero voltage switching conditions are given by expressions (26), (27), and (28) below:

$$-2m\phi_f + (1-m)\pi - (1-m)\alpha_p \geq 0 \quad (26)$$

$$-(1-m)\pi + \alpha_p - m\alpha_s \geq 0 \quad (27)$$

$$2m\phi_f + (1-m)\pi - (1-m)\alpha_p \geq 0 \quad (28)$$

Using expressions (26) and (27), yields expressions (29) and (30) as conditions for zero voltage switching.

$$\alpha_p \leq \pi - \frac{2m\phi_f}{1-m} \tag{29}$$

$$m\alpha_s \leq -\pi + m\pi + \alpha_p \tag{30}$$

Substituting equation (31) in expression (30) yields expression (32) below $$\alpha_p = \pi - \frac{2m\phi_f}{1-m} \tag{31}$$

$$\alpha_s \leq \pi - \frac{2\phi_f}{1-m} \tag{32}$$

Substituting equation (31) and expression (32) into expression (28) yields expression (33) below, which demonstrates that DAB converter 114 utilizing equations (2) and (3) for intra-bridge phase shifting achieves zero voltage switching starting from zero power throughout operational Region 1 with (m)<1.

$$\phi_f \geq 0 \tag{33}$$

With reference to FIG. 10B, for operation in Region 1 with voltage transfer ratio (m)>1, the inductance current direction for zero voltage switching performance of each switch is provided in Table 2.

TABLE 2

| Switch(es) | Inductance Current Direction for ZVS Performance |
|---|---|
| $S_{1p}(S_{2p})$ | $I_b > 0$ |
| $S_{4p}(S_{3p})$ | $I_c > 0$ |
| $S_{1s}(S_{2s})$ | $I_d > 0$ |
| $S_{4s}(S_{3s})$ | $I_a > 0$ |

Current values are given by equations (34), (35), and (36) below:

$$i_a = \frac{V_{in}}{2 \cdot X_l} \cdot [2\phi_f + (m-1)\pi - (m-1)\alpha_s] \tag{34}$$

$$i_b = i_c = \frac{V_{in}}{2 \cdot X_l} \cdot [-(m-1)\pi - \alpha_p + m\alpha_s] \tag{35}$$

$$i_d = \frac{V_{in}}{2 \cdot X_l} \cdot [2\phi_f - (m-1)\pi + (m-1)\alpha_s] \tag{36}$$

Zero voltage switching conditions are given by expressions (37), (38), and (39) below:

$$2\phi_f + (m-1)\pi - (m-1)\alpha_s \geq 0 \tag{37}$$

$$-(m-1)\pi - \alpha_p + m\alpha_s \geq 0 \tag{38}$$

$$2\phi_f - (m-1)\pi + (m-1)\alpha_s \geq 0 \tag{39}$$

Using expressions (39) and (38), yields expressions (40) and (41) as conditions for zero voltage switching.

$$\alpha_s \leq \pi - \frac{2\phi_f}{m-1} \tag{40}$$

$$\alpha_p \leq \pi - m\pi + m\alpha_s \tag{41}$$

Substituting equation (42) in expression (41) yields expression (43) below $$\alpha_s = \pi - \frac{2\phi_f}{m-1} \tag{42}$$

$$\alpha_p \leq \pi - \frac{2m\phi_f}{m-1} \tag{43}$$

Substituting equation (42) and expression (43) into expression (37) yields expression (44) below, which demonstrates that DAB converter 114 utilizing equations (2) and (3) for intra-bridge phase shifting achieves zero voltage switching starting from zero power throughout operational Region 1 with (m)>1.

$$\phi_f \geq 0 \tag{44}$$

With reference to FIG. 10C, for operation in Region 2 with voltage transfer ratio (m)<1, the inductance current direction for zero voltage switching performance of each switch is provided in Table 3.

TABLE 3

| Switch(es) | Inductance Current Direction for ZVS Performance |
|---|---|
| $S_{1p}(S_{2p})$ | $I_{L2} > 0$ |
| $S_{4p}(S_{3p})$ | $I_{L0} > 0$ |
| $S_{1s}(S_{2s})$ | $I_{L1} > 0$ |
| $S_{4s}(S_{3s})$ | $I_{L1} > 0$ |

Current values are given by equations (45), (46), and (47) below:

$$I_{L0} = \frac{V_{in}}{2X_l}(2m\phi - 2m\alpha_p + \pi - m\pi - \alpha_p) \tag{45}$$

$$I_{L1} = \frac{V_{in}}{2X_l}(2\phi - \alpha_p - \pi + m\pi) \tag{46}$$

$$I_{L2} = \frac{V_{in}}{2X_l}(2m\phi + \pi - m\pi - \alpha_p) \tag{47}$$

Zero voltage switching conditions are given by expressions (48), (49), and (50) below:

$$2m\phi_f - m\alpha_p + \pi - m\pi - \alpha_p \geq 0 \tag{48}$$

$$2\phi_f - \pi + m\pi \geq 0 \tag{49}$$

$$2m\phi_f + \pi - m\pi - (1-m)\alpha_p \geq 0 \tag{50}$$

Substituting equation (51), given for the single intra-bridge phase shift method, into expressions (48), (49), and (50) yields expressions (52), (53), and (54) as conditions for zero voltage switching.

$$\alpha_{p,opt} = (-2\phi_f + \pi)\left(\frac{1-m}{m}\right) \tag{51}$$

$$\phi_f \geq \frac{\pi(1-m)}{2} \tag{52}$$

$$\phi_f \geq \frac{\pi(1-m)}{2} \tag{53}$$

-continued $$\phi_f \geq \frac{\pi(1-m)}{2} \cdot \left(2 - \frac{1}{m}\right) \quad (54)$$

Generalizing expressions (52), (53), (54) yields expression (55), which demonstrates that DAB converter 114 utilizing equations (4) and (5) for intra-bridge phase shifting achieves zero voltage switching starting from zero power throughout operational Region 2 with (m)<1.

$$\phi_f \geq \frac{\pi(1-m)}{2} \quad (55)$$

With reference to FIG. 10D, for operation in Region 2 with voltage transfer ratio (m)>1, the inductance current direction for zero voltage switching performance of each switch is provided in Table 4.

TABLE 4

| Switch(es) | Inductance Current Direction for ZVS Performance |
|---|---|
| $S_{1p}(S_{2p})$ | $I_{L0} > 0$ |
| $S_{4p}(S_{3p})$ | $I_{L0} > 0$ |
| $S_{1s}(S_{2s})$ | $I_{L1} > 0$ |
| $S_{4s}(S_{3s})$ | $I_{L2} > 0$ |

Current values are given by equations (56), (57), and (58) below:

$$I_{L0} = \frac{V_{in}}{2X_l}(2m\phi_f - \pi(m-1)) \quad (56)$$

$$I_{L1} = \frac{V_{in}}{2X_l}(2\phi_f + \pi(m-1) - \alpha_s(m+1)) \quad (57)$$

$$I_{L2} = \frac{V_{in}}{2X_l}(2\phi_f + \pi(m-1) - \alpha_s(m-1)) \quad (58)$$

Zero voltage switching conditions are given by expressions (59), (60), and (61) below:

$$2m\phi_f - \pi(m-1) \geq 0 \quad (59)$$

$$2\phi_f + \pi(m-1) - \alpha_s(m+1) \geq 0 \quad (60)$$

$$2\phi_f + \pi(m-1) - \alpha_s(m-1) \geq 0 \quad (61)$$

Substituting equation (62), given for the single intra-bridge phase shift method, into expressions (59), (60), and (61) yields expressions (63), (64), and (65), respectively, as conditions for zero voltage switching.

$$\alpha_{s,opt} = (-2\phi_f + \pi)(m-1) \quad (62)$$

$$\phi_f \geq \frac{\pi(m-1)}{2m} \quad (63)$$

$$\phi_f \geq \frac{\pi(m-1)}{2m} \quad (64)$$

$$\phi_f \geq \frac{\pi(m-1)}{2m} \cdot \left(\frac{m^2 - 2m}{m^2 - 2m + 2}\right) \quad (65)$$

Generalizing expressions (63), (64), and (65) yields expression (66), which demonstrates that DAB converter 114 utilizing equations (4) and (5) for intra-bridge phase shifting achieves zero voltage switching starting from zero power throughout operational Region 2 with (m)>1.

$$\phi_f \geq \frac{\pi(m-1)}{2m} \quad (66)$$

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

What is claimed is:

1. A method for controlling a dual active bridge converter, comprising:
   selecting, based on a voltage transfer ratio, an intra-bridge phase shift computation algorithm from among a plurality of stored intra-bridge phase shift computation algorithms;
   computing, based on the selected intra-bridge phase shift computation algorithm, a target intra-bridge phase shift amount between two bridges of the dual active bridge converter; and
   causing a plurality of switch control signals, which are provided to respective switches of the dual active bridge converter, to switch according to a time-based switching sequence based on the target intra-bridge phase shift amount to compensate for variations in an output voltage.

2. The method of claim 1, wherein the computed target intra-bridge phase shift amount is further based on a rule stored in memory that maps output voltages of the dual active bridge converter to respective target intra-bridge phase shift amounts associated with zero voltage switching for the respective output voltages, and wherein the time-based switching sequence is a zero voltage switching sequence generated based on the target intra-bridge phase shift amount.

3. The method of claim 1, further comprising:
   sensing the output voltage of the dual active bridge converter; and
   computing the voltage transfer ratio based on the output voltage and an input voltage of the dual active bridge converter.

4. The method of claim 1, wherein selecting the intra-bridge phase shift computation algorithm comprises:
   determining whether the voltage transfer ratio satisfies a threshold; and
   selecting the intra-bridge phase shift computation algorithm from among the plurality of stored intra-bridge phase shift computation algorithms, based on whether the voltage transfer ratio satisfies the threshold.

5. The method of claim 4, wherein selecting the intra-bridge phase shift computation algorithm further comprises:
selecting a first intra-bridge phase shift computation algorithm in response to determining that the voltage transfer ratio satisfies the threshold, and
selecting a second intra-bridge phase shift computation algorithm, distinct from the first intra-bridge phase shift computation algorithm, in response to determining that the voltage transfer ratio does not satisfy the threshold.

6. The method of claim 3, wherein determining the input voltage comprises at least one of: detecting a signal level at an input port of the dual active bridge converter that receives power from an electrical power grid or retrieving an input voltage value stored in memory.

7. The method of claim 3, further comprising:
determining an updated value of at least one of the input voltage or the output voltage of the dual active bridge converter; and
in response to determining the updated value of at least one of the input voltage or the output voltage of the dual active bridge converter:
computing, based on the updated value of at least one of the input voltage and the output voltage of the dual active bridge converter, an updated target intra-bridge phase shift amount between the two bridges of the dual active bridge converter; and
causing the plurality of switch control signals, which are provided to the dual active bridge converter, to switch according to an updated time-based switching sequence based on the updated target intra-bridge phase shift amount.

8. The method of claim 1, further comprising:
determining a target effective phase shift based on a target power transfer amount,
wherein the target intra-bridge phase shift amount is computed further based at least in part on the target effective phase shift.

9. The method of claim 3, wherein sensing the output voltage comprises detecting a signal level at an output port of the dual active bridge converter that is coupled to a rechargeable battery.

10. The method of claim 1, wherein causing the plurality of switch control signals to switch according to the time-based switching sequence comprises selectively switching in succession respective ones of the plurality of control signals at respective times within a time period based on the target intra-bridge phase shift amount.

11. A system for controlling a dual active bridge converter, comprising:
a memory storing instructions;
an input port coupled to an output port of the dual active bridge converter;
a plurality of output ports coupled to switches of the dual active bridge converter; and
control circuitry coupled to the memory, the input port, and the plurality of output ports and configured execute the stored instructions to:
select, based on a voltage transfer ratio, an intra-bridge phase shift computation algorithm from among a plurality of intra-bridge phase shift computation algorithms stored in the memory;
compute, based on the selected intra-bridge phase shift computation algorithm, a target intra-bridge phase shift amount between two bridges of the dual active bridge converter; and
cause a plurality of switch control signals, which are provided to respective switches of the dual active bridge converter via the plurality of output ports, to switch according to a time-based switching sequence based on the target intra-bridge phase shift amount to compensate for variations in an output voltage.

12. The system of claim 11, wherein the computed target intra-bridge phase shift amount is further based on a rule stored in the memory that maps output voltages of the dual active bridge converter to respective intra-bridge phase shift amounts associated with zero voltage switching for the respective output voltages, and wherein the time-based switching sequence is a zero voltage switching sequence generated based on the target intra-bridge phase shift amount.

13. The system of claim 11, wherein the control circuitry is further configured to:
determine the output voltage of the dual active bridge converter via the input port; and
compute the voltage transfer ratio based on the output voltage and an input voltage of the dual active bridge converter.

14. The system of claim 11, wherein the control circuitry is configured to select the intra-bridge phase shift computation algorithm by:
determining whether the voltage transfer ratio satisfies a threshold; and
selecting the intra-bridge phase shift computation algorithm from among the plurality of stored intra-bridge phase shift computation algorithms, based on whether the voltage transfer ratio satisfies the threshold.

15. The system of claim 14, wherein the control circuitry is further configured to select the intra-bridge phase shift computation algorithm by:
selecting a first intra-bridge phase shift computation algorithm in response to determining that the voltage transfer ratio satisfies the threshold, and
selecting a second intra-bridge phase shift computation algorithm, distinct from the first intra-bridge phase shift computation algorithm, in response to determining that the voltage transfer ratio does not satisfy the threshold.

16. The system of claim 13, further comprising a second input port configured to receive power from an electrical power grid, wherein the control circuitry is further configured to determine the input voltage of the dual active bridge converter by at least one of:
detecting a signal level at the second input port; or
retrieving an input voltage value stored in the memory.

17. The system of claim 11, wherein the control circuitry is further configured to determine a target effective phase shift based on a target power transfer amount, wherein the control circuitry is configured to compute the target intra-bridge phase shift amount further based at least in part on the target effective phase shift.

18. The system of claim 13, wherein the control circuitry is configured to determine the output voltage by detecting, via the input port, a signal level at the output port of the dual active bridge converter that is coupled to a rechargeable battery.

19. The system of claim 11, wherein the control circuitry is configured to cause the plurality of switch control signals to switch according to the time-based switching sequence by selectively switching in succession respective ones of the plurality of control signals at respective times within a time period based on the target intra-bridge phase shift amount.

20. A method for adaptive control of a dual active bridge converter, comprising:

periodically sensing an output voltage of the dual active bridge converter coupled to a charging port of an electric vehicle;
in response to sensing a change in the output voltage:
computing a voltage transfer ratio based on the output voltage and an input voltage of the dual active bridge converter;
selecting, based on a voltage transfer ratio, an intra-bridge phase shift computation algorithm from among a plurality of stored intra-bridge phase shift computation algorithms; and
computing, based on the selected intra-bridge phase shift computation algorithm, a target intra-bridge phase shift amount between two bridges of the dual active bridge converter;
generating a time-based zero voltage switching sequence based on the target intra-bridge phase shift amount; and
causing a plurality of switch control signals, which are provided to respective switches of the dual active bridge converter, to switch according to the time-based zero voltage switching sequence to compensate for variations in the output voltage.

\* \* \* \* \*